US 8,392,684 B2

(12) United States Patent
Hughes

(10) Patent No.: US 8,392,684 B2
(45) Date of Patent: Mar. 5, 2013

(54) DATA ENCRYPTION IN A NETWORK MEMORY ARCHITECTURE FOR PROVIDING DATA BASED ON LOCAL ACCESSIBILITY

(75) Inventor: David Anthony Hughes, Los Altos Hills, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 1305 days.

(21) Appl. No.: 11/497,026

(22) Filed: Jul. 31, 2006

(65) Prior Publication Data

US 2007/0038858 A1    Feb. 15, 2007

Related U.S. Application Data

(63) Continuation-in-part of application No. 11/202,697, filed on Aug. 12, 2005.

(51) Int. Cl.
*G06F 12/00* (2006.01)
*G06F 13/00* (2006.01)
*G06F 13/28* (2006.01)
*G06F 15/16* (2006.01)
*G06F 7/04* (2006.01)
*G06F 12/14* (2006.01)
*G06F 17/30* (2006.01)
*G06F 7/00* (2006.01)
*H04L 9/08* (2006.01)

(52) U.S. Cl. ........ 711/165; 711/100; 711/111; 711/112; 711/113; 711/117; 711/118; 709/217; 709/218; 709/219; 380/281; 380/283; 380/284; 726/18; 726/19

(58) Field of Classification Search ................. None
See application file for complete search history.

(56) References Cited

U.S. PATENT DOCUMENTS

| | | | |
|---|---|---|---|
| 5,307,413 A | 4/1994 | Denzer | |
| 5,359,720 A | 10/1994 | Tamura et al. | |
| 5,483,556 A | 1/1996 | Pillan et al. | |
| 5,592,613 A | 1/1997 | Miyazawa et al. | |
| 5,611,049 A | 3/1997 | Pitts | |
| 5,675,587 A | 10/1997 | Okuyama et al. | |
| 5,754,774 A | 5/1998 | Bittinger et al. | |
| 5,802,106 A | 9/1998 | Packer | |
| 5,883,891 A | 3/1999 | Williams et al. | |
| 6,000,053 A | 12/1999 | Levine et al. | |
| 6,003,087 A | 12/1999 | Housel et al. | |

(Continued)

FOREIGN PATENT DOCUMENTS

EP    1507353 A2    2/2005

OTHER PUBLICATIONS

Muthitacharoen, Athicha et al., "A Low-bandwidth Network File System," 2001, in Proc. of the 18th ACM Symposium on Operating Systems Principles, Banff, Canada, pp. 174-187.

(Continued)

*Primary Examiner* — Sanjiv Shah
*Assistant Examiner* — Marwan Ayash
(74) *Attorney, Agent, or Firm* — Carr & Ferrell LLP

(57) ABSTRACT

A network memory system for ensuring compliance is disclosed. The network memory system comprises a first appliance configured to encrypt first data, store the encrypted first data in a first memory device. The first appliance also determines whether the encrypted first data exists in a second appliance and transmits a store instruction comprising the encrypted first data based on the determination that the encrypted first data does not exist in the second appliance. The second appliance is further configured to receive a retrieve instruction comprising an index at which the encrypted first data is stored, process the retrieve instruction to obtain encrypted response data, and decrypt the encrypted response data.

24 Claims, 14 Drawing Sheets

U.S. PATENT DOCUMENTS

| | | | |
|---|---|---|---|
| 6,081,883 | A | 6/2000 | Popelka et al. |
| 6,295,541 | B1 | 9/2001 | Bodnar et al. |
| 6,311,260 | B1 | 10/2001 | Stone et al. |
| 6,374,266 | B1 | 4/2002 | Shnelvar |
| 6,434,662 | B1 | 8/2002 | Greene et al. |
| 6,438,664 | B1 | 8/2002 | McGrath et al. |
| 6,452,915 | B1 | 9/2002 | Jorgensen |
| 6,587,985 | B1 | 7/2003 | Fukushima et al. |
| 6,618,397 | B1 | 9/2003 | Huang |
| 6,633,953 | B2 | 10/2003 | Stark |
| 6,643,259 | B1 | 11/2003 | Borella et al. |
| 6,650,644 | B1 | 11/2003 | Colley et al. |
| 6,718,361 | B1 | 4/2004 | Basani et al. |
| 6,738,379 | B1 | 5/2004 | Balazinski et al. |
| 6,769,048 | B2 | 7/2004 | Goldberg et al. |
| 6,791,945 | B1 | 9/2004 | Levenson et al. |
| 6,856,651 | B2 | 2/2005 | Singh |
| 6,859,842 | B1 | 2/2005 | Nakamichi et al. |
| 6,910,106 | B2 | 6/2005 | Sechrest et al. |
| 6,978,384 | B1 | 12/2005 | Milliken |
| 7,007,044 | B1 | 2/2006 | Rafert et al. |
| 7,020,750 | B2 | 3/2006 | Thiyagaranjan et al. |
| 7,035,214 | B1 | 4/2006 | Seddigh et al. |
| 7,069,342 | B1 | 6/2006 | Biederman |
| 7,113,962 | B1 | 9/2006 | Kee et al. |
| 7,120,666 | B2 | 10/2006 | McCanne et al. |
| 7,145,889 | B1 | 12/2006 | Zhang et al. |
| 7,197,597 | B1 | 3/2007 | Scheid et al. |
| 7,200,847 | B2 * | 4/2007 | Straube et al. ............... 719/313 |
| 7,215,667 | B1 | 5/2007 | Davis |
| 7,242,681 | B1 | 7/2007 | Van Bokkelen et al. |
| 7,243,094 | B2 | 7/2007 | Tabellion et al. |
| 7,266,645 | B2 | 9/2007 | Garg et al. |
| 7,318,100 | B2 | 1/2008 | Demmer et al. |
| 7,366,829 | B1 | 4/2008 | Luttrell et al. |
| 7,380,006 | B2 | 5/2008 | Srinivas et al. |
| 7,383,329 | B2 | 6/2008 | Erickson |
| 7,383,348 | B2 | 6/2008 | Seki et al. |
| 7,388,844 | B1 | 6/2008 | Brown et al. |
| 7,389,357 | B2 | 6/2008 | Duffie et al. |
| 7,389,393 | B1 | 6/2008 | Karr et al. |
| 7,417,991 | B1 | 8/2008 | Crawford et al. |
| 7,420,992 | B1 | 9/2008 | Fang et al. |
| 7,428,573 | B2 | 9/2008 | McCanne et al. |
| 7,451,237 | B2 | 11/2008 | Takekawa et al. |
| 7,453,379 | B2 | 11/2008 | Plamondon |
| 7,457,315 | B1 | 11/2008 | Smith |
| 7,471,629 | B2 | 12/2008 | Melpignano |
| 7,532,134 | B2 | 5/2009 | Samuels et al. |
| 7,555,484 | B2 | 6/2009 | Kulkarni et al. |
| 7,571,343 | B1 | 8/2009 | Xiang et al. |
| 7,619,545 | B2 | 11/2009 | Samuels et al. |
| 7,620,870 | B2 | 11/2009 | Srinivasan et al. |
| 7,639,700 | B1 | 12/2009 | Nabhan et al. |
| 7,676,554 | B1 | 3/2010 | Malmskog et al. |
| 7,714,747 | B2 | 5/2010 | Fallon |
| 7,746,781 | B1 | 6/2010 | Xiang |
| 7,849,134 | B2 | 12/2010 | McCanne et al. |
| 7,853,699 | B2 | 12/2010 | Wu et al. |
| 7,953,869 | B2 | 5/2011 | Demmer et al. |
| 2001/0054084 | A1 | 12/2001 | Kosmynin |
| 2002/0007413 | A1 | 1/2002 | Garcia-Luna-Aceves et al. |
| 2002/0040475 | A1 * | 4/2002 | Yap et al. .................... 725/39 |
| 2002/0065998 | A1 | 5/2002 | Buckland |
| 2002/0078242 | A1 | 6/2002 | Viswanath |
| 2002/0101822 | A1 | 8/2002 | Ayyagari et al. |
| 2002/0107988 | A1 | 8/2002 | Jordan |
| 2002/0116424 | A1 | 8/2002 | Radermacher et al. |
| 2002/0131434 | A1 | 9/2002 | Vukovic et al. |
| 2002/0150041 | A1 | 10/2002 | Reinshmidt et al. |
| 2002/0163911 | A1 | 11/2002 | Wee et al. |
| 2002/0169818 | A1 | 11/2002 | Stewart et al. |
| 2002/0181494 | A1 | 12/2002 | Rhee |
| 2002/0188871 | A1 | 12/2002 | Noehring et al. |
| 2002/0194324 | A1 | 12/2002 | Guha |
| 2003/0009558 | A1 | 1/2003 | Ben-Yehezkel |
| 2003/0142658 | A1 | 7/2003 | Ofuji et al. |
| 2003/0149661 | A1 | 8/2003 | Mitchell et al. |
| 2003/0233431 | A1 | 12/2003 | Reddy et al. |
| 2004/0008711 | A1 | 1/2004 | Lahti et al. |
| 2004/0047308 | A1 | 3/2004 | Kavanagh et al. |
| 2004/0083299 | A1 | 4/2004 | Dietz et al. |
| 2004/0114569 | A1 | 6/2004 | Naden et al. |
| 2004/0117571 | A1 * | 6/2004 | Chang et al. .................. 711/162 |
| 2004/0123139 | A1 | 6/2004 | Aiello et al. |
| 2004/0199771 | A1 * | 10/2004 | Morten et al. ................ 713/176 |
| 2004/0202110 | A1 | 10/2004 | Kim |
| 2004/0203820 | A1 | 10/2004 | Billhartz |
| 2004/0205332 | A1 | 10/2004 | Bouchard et al. |
| 2004/0243571 | A1 * | 12/2004 | Judd ................................ 707/3 |
| 2004/0255048 | A1 | 12/2004 | Lev Ran et al. |
| 2005/0010653 | A1 | 1/2005 | McCanne |
| 2005/0044270 | A1 | 2/2005 | Grove et al. |
| 2005/0053094 | A1 | 3/2005 | Cain et al. |
| 2005/0091234 | A1 | 4/2005 | Hsu et al. |
| 2005/0111460 | A1 | 5/2005 | Sahita |
| 2005/0131939 | A1 | 6/2005 | Douglis et al. |
| 2005/0132252 | A1 | 6/2005 | Fifer et al. |
| 2005/0141425 | A1 | 6/2005 | Foulds |
| 2005/0171937 | A1 | 8/2005 | Hughes et al. |
| 2005/0177603 | A1 | 8/2005 | Shavit |
| 2005/0190694 | A1 | 9/2005 | Ben-Nun et al. |
| 2005/0210151 | A1 | 9/2005 | Abdo et al. |
| 2005/0220019 | A1 | 10/2005 | Melpignano |
| 2005/0235119 | A1 | 10/2005 | Sechrest et al. |
| 2005/0243743 | A1 | 11/2005 | Kimura |
| 2005/0256972 | A1 | 11/2005 | Cochran et al. |
| 2005/0278459 | A1 | 12/2005 | Boucher et al. |
| 2005/0286526 | A1 | 12/2005 | Sood et al. |
| 2006/0013210 | A1 | 1/2006 | Bordogna et al. |
| 2006/0031936 | A1 * | 2/2006 | Nelson et al. .................... 726/23 |
| 2006/0036901 | A1 | 2/2006 | Yang et al. |
| 2006/0039354 | A1 | 2/2006 | Rao et al. |
| 2006/0059171 | A1 | 3/2006 | Borthakur et al. |
| 2006/0059173 | A1 | 3/2006 | Hirsch et al. |
| 2006/0117385 | A1 | 6/2006 | Mester et al. |
| 2006/0143497 | A1 | 6/2006 | Zohar et al. |
| 2006/0195547 | A1 | 8/2006 | Sundarrajan et al. |
| 2006/0195840 | A1 | 8/2006 | Sundarrajan et al. |
| 2006/0212426 | A1 | 9/2006 | Shakara et al. |
| 2006/0218390 | A1 | 9/2006 | Loughran et al. |
| 2006/0227717 | A1 | 10/2006 | van den Berg et al. |
| 2006/0250965 | A1 | 11/2006 | Irwin |
| 2006/0280205 | A1 | 12/2006 | Cho |
| 2007/0002804 | A1 | 1/2007 | Xiong et al. |
| 2007/0011424 | A1 | 1/2007 | Sharma et al. |
| 2007/0076693 | A1 | 4/2007 | Krishnaswamy |
| 2007/0110046 | A1 | 5/2007 | Farrell et al. |
| 2007/0115812 | A1 | 5/2007 | Hughes |
| 2007/0127372 | A1 | 6/2007 | Khan et al. |
| 2007/0130114 | A1 | 6/2007 | Li et al. |
| 2007/0140129 | A1 | 6/2007 | Bauer et al. |
| 2007/0174428 | A1 | 7/2007 | Lev Ran et al. |
| 2007/0195702 | A1 | 8/2007 | Yuen et al. |
| 2007/0198523 | A1 | 8/2007 | Hayim |
| 2007/0226320 | A1 | 9/2007 | Hager et al. |
| 2007/0244987 | A1 | 10/2007 | Pedersen et al. |
| 2007/0245079 | A1 | 10/2007 | Bhattacharjee et al. |
| 2007/0258468 | A1 | 11/2007 | Bennett |
| 2007/0263554 | A1 | 11/2007 | Finn |
| 2007/0276983 | A1 | 11/2007 | Zohar et al. |
| 2008/0005156 | A1 | 1/2008 | Edwards et al. |
| 2008/0013532 | A1 | 1/2008 | Garner et al. |
| 2008/0016301 | A1 | 1/2008 | Chen |
| 2008/0028467 | A1 | 1/2008 | Kommareddy et al. |
| 2008/0133536 | A1 | 6/2008 | Bjorner et al. |
| 2008/0184081 | A1 | 7/2008 | Hama et al. |
| 2008/0229137 | A1 | 9/2008 | Samuels et al. |
| 2008/0243992 | A1 | 10/2008 | Jardetzky et al. |
| 2008/0313318 | A1 | 12/2008 | Vermeulen et al. |
| 2008/0320151 | A1 | 12/2008 | McCanne et al. |
| 2009/0060198 | A1 | 3/2009 | Little |
| 2009/0100483 | A1 | 4/2009 | McDowell |
| 2009/0158417 | A1 | 6/2009 | Khanna et al. |
| 2009/0175172 | A1 | 7/2009 | Prytz et al. |
| 2009/0234966 | A1 | 9/2009 | Samuels et al. |
| 2010/0011125 | A1 | 1/2010 | Yang et al. |

| | | |
|---|---|---|
| 2010/0020693 A1 | 1/2010 | Thakur |
| 2010/0115137 A1 | 5/2010 | Kim et al. |
| 2010/0290364 A1 | 11/2010 | Black |

OTHER PUBLICATIONS

Zhao et al.; "Analysis and Improvement on IPSEC Anti-Replay Window Protocol"; 2003; IEEE' pp. 553-558.

Singh et al. ;"Future of Internet Security—IPSEC"; 2005; pp. 1-8.

Shared LAN Cache Datasheet, 1996, http://www.lancache.com/slcdata.htm.

""A protocol-independent technique for eliminating redundant network traffic"", ACM SIGCOMM Computer CommunicationReview, vol. 30, Issue 4 (Oct. 2000) pp. 87-95, Year of Publication: 2000".

"B. Hong, D. Plantenberg, D. D. E. Long, and M. Sivan-Zimet. ""Duplicate data elimination in a SAN file system"", InProceedings of the 21 st Symposium on Mass Storage Systems (MSS '04), Goddard, MD, Apr. 2004. IEEE."

"You, L. L. and Karamanolis, C. 2004. ""Evaluation of efficient archival storage techniques"", In Proceedings of the 21 st IEEESymposium on Mass Storage Systems and Technologies (MSST)."

"Fred Douglis and Arun Iyengar, Application specific Delta-encoding via Resemblance Detection", Published in the 2003 USENIX Annual Technical Conference.

"You L. L. et al., ""Deep Store an Archival Storage System Architecture"" Data Engineering, 2005. ICDE 2005. Proceedings. 21st.inti Conf on Tokyo, Japan, Apr. 5-8, 2005, pp. 12".

"Udi Manber. ""Finding Similar Files in a Large File System"", TR 93-33 Oct. 1994, Department of Computer Science,University of Arizona. http://webglimpse.net/pubs/TR93-33.pdf. Also appears in the 1994 winter USENIX Technical Conference."

* cited by examiner

DATA ENCRYPTION IN A NETWORK MEMORY ARCHITECTURE FOR PROVIDING DATA BASED ON LOCAL ACCESSIBILITY

CROSS-REFERENCE

This application is a continuation-in-part application of U.S. patent application Ser. No. 11/202,697 filed on Aug. 12, 2005, entitled "Network Memory Architecture for Providing Data Based on Local Accessibility."

BACKGROUND

1. Technical Field

The present invention relates generally to maintaining the compliance of data in a network and more particularly to encrypting data in a network memory architecture.

2. Description of Related Art

To allow remote employees access to an enterprise's information systems, organizations typically choose between two networking approaches: centralized servers or distributed servers. Centralized server implementations have the advantage of simplicity since an information technology (IT) professional centrally manages, maintains, and enforces policies for the organization's data.

An issue that arises in allowing remote access to information is that unauthorized users may also gain access to the organization's data. Additionally, legislation in the United States and individual states requires that certain information is encrypted and/or make the organization civilly liable for injuries resulting from data breaches. Two examples of federal legislation requiring compliance include the Health Insurance Portability and Accountability Act (HIPAA) and the Sarbanes-Oxley Act. To secure the data and memory against theft, viruses, and hackers, the data is encrypted using an algorithm such as Advanced Encryption Scheme (AES), Data Encryption Scheme (DES), or Triple DES. However, two issues arise when encrypting data on a network. First, encryption can negatively affect performance. Second, when not encrypted, data is still vulnerable to unauthorized use.

Many organizations select the distributed server implementation to mitigate some of the problems with the centralized server implementation. FIG. 1 illustrates a distributed server system 100 in the prior art. The distributed server system 100 includes a branch office 110, a central office 120, and a communication network 130. The communication network 130 forms a wide area network (WAN) between the branch office 110 and the central office 120.

In the distributed server system 100, the branch servers 140 (e.g., email servers, file servers and databases) are placed locally in the branch office 110, rather than solely in the central office 120. The branch servers 140 typically store all or part of the organization's data. The branch servers 140 generally provide improved application performance and data access for the computers 160. The branch servers 140 respond to a request for the organization's data from the local data. For each request for the data, the central servers 170 potentially do not need to transfer the data over the communication network 130 (i.e., the WAN), via router 180 and router 150. Synchronization and backup procedures are implemented to maintain the coherency between the local data in the branch office 110 and the data in the central office 120.

Unfortunately, managing the distributed server system 100 is complex and costly. From a physical point of view, the distributed server system 100 with one hundred branch offices requires an order of one hundred times more equipment than a centralized server approach. Each piece of the equipment not only needs to be purchased, but also installed, managed, and repaired driving significant life cycle costs. The branch office 110 may need additional local IT personnel to perform operations because of this "Server Sprawl". Furthermore, the multiplication of managed devices means additional license costs, security vulnerabilities, and patching activities.

In distributed server implementations (e.g., the distributed server system 100), the data, including the "golden copy" or most up-to-date version of mission critical data, is often stored (at least temporarily) only on the branch servers 140 in the branch office 110: Organizations implement complex protocols and procedures for replication and synchronization to ensure that the mission critical data is backed up and kept in-sync across the WAN with the central servers 170.

Security vulnerabilities are a particular problem in providing compliance to the distributed server system 100. As the "golden copy" is stored on a local server and backed up locally, this computer or storage may be stolen, infected with viruses, or otherwise compromised. Having multiple servers also increases the overall exposure of the system to security breaches. Additionally, locally encrypting the data or the system further complicates the replication and synchronization of central servers 170 and decreases performance. Therefore, data in a distributed server implementation is vulnerable and maintaining compliance can be difficult.

FIG. 2 illustrates a centralized server system 200 in the prior art. The centralized server system 200 includes a branch office 210 and a central office 220 coupled by a communication network 230. The communication network 130 forms a WAN between the branch office 210 and the central office 220.

Typically, the central servers 260 in the central office 220 store the organization's data. Computers 240 make requests for the data from the central servers 260 over the communication network 230. The central servers 260 then return the data to the computers 240 over the communication network 230. Typically, the central servers 260 are not encrypted. The central servers 260 are usually maintained in a secure location such as a locked building requiring a hand scan or an iris scan for entry to prevent theft of the hard disks on which data is stored. This is a more secure system because the computers 240 contain only a small amount of unencrypted data that can be breached if, for example, the computer is stolen, resold, or infected by a virus.

The communication network 230 typically comprises a private network (e.g., a leased line network) or a public network (e.g., the Internet). The connections to the communication network 230 from the branch office 210 and the central office 220 typically cause a bandwidth bottleneck for exchanging the data over the communication network 230. The exchange of the data between the branch office 210 and the central office 220, in the aggregate, will usually be limited to the bandwidth of the slowest link in the communication network 230.

For example, the router 250 connects to the communication network 230 by a T1 line, which provides a bandwidth of approximately 1.544 Megabits/second (Mbps). The router 270 connects to the communication network 230 by a T3 line, which provides a bandwidth of approximately 45 Megabits/second (Mbps). Even though the communication network 230 may provide an internal bandwidth greater than 1.544 Mbps or 45 Mbps, the available bandwidth between the branch office 210 and the central office 220 is limited to the bandwidth of 1.544 Mbps (i.e., the T1 connection). Connections with higher bandwidth to relieve the bandwidth bottleneck across the communication network 230 are available, but are generally expensive and have limited availability.

Moreover, many applications do not perform well over the communication network 230 due to the limited available bandwidth. Developers generally optimize the applications for performance over a local area network (LAN) which typically provides a bandwidth between 10 Mbps to Gigabit/second (Gbps) speeds. The developers of the applications assume small latency and high bandwidth across the LAN between the applications and the data. However, the latency across the communication network 130 typically will be 100 times that across the LAN, and the bandwidth of the communication network 230 will be 1/100th of the LAN.

Furthermore, although FIG. 1 and FIG. 2 illustrate a single branch office and a single central office, multiple branch offices and multiple central offices exacerbate the previously discussed problems. For example, in a centralized server implementation having multiple branches, computers in each of the multiple branch offices make requests over the WAN to central servers for the organization's data. The data transmitted by the central servers in response to the requests quickly saturate the available bandwidth of the central office's connection to the communication network, further decreasing application performance and data access at the multiple branch offices. In a distributed server implementation having multiple branches, the cost to provide branch servers in each of the multiple branch offices increases, as well as the problems of licensing, security vulnerabilities, patching activities, and data replication and synchronization. Moreover, different branches may simultaneously attempt to modify the same piece of information. Maintaining coherency in a distributed implementation requires complex and error prone protocols.

As well as implementing centralized servers or distributed servers, organizations also implement mechanisms for caching to improve application performance and data access. A cache is generally used to reduce the latency of the communication network (e.g., communication network 230) forming the WAN (i.e., because the request is satisfied from the local cache) and to reduce network traffic over the WAN (i.e., because responses are local, the amount of bandwidth used is reduced).

Web caching, for example, is the caching of web documents (i.e., HTML pages, images, etc.) in order to reduce web site access times and bandwidth usage. Web caching typically stores unencrypted local copies of the requested web documents. The web cache satisfies subsequent requests for the web documents if the requests meet certain predetermined conditions.

One problem with web caching is that the web cache is typically only effective for rarely modified static web documents. For dynamic documents, there is a difficult tradeoff between minimizing network traffic and the risk of the web cache serving up stale data. The web cache may serve stale data because the web cache responds to requests without consulting the server.

Another problem is that the web cache does not recognize that two otherwise identical documents are the same if they have different Uniform Resource Locator (URL). The web cache does not consider the content or context of the documents. Thus, the web cache caches the documents by URL or filename without a determination of the content or context of the document. Moreover, the web cache stores entire objects (such as documents) and cache-hits are binary: either a perfect match or a miss. Even where only small changes are made to the documents, the web cache does not use the cached copy of the documents to reduce network traffic.

SUMMARY OF THE INVENTION

A network memory system for ensuring compliance is disclosed. The network memory system comprises a first appliance that encrypts data and stores the encrypted data in a first memory device. The first appliance also determines whether the encrypted data exists in a second appliance and transmits a store instruction comprising the encrypted data based on the determination that the encrypted first data does not exist in the second appliance. The second appliance receives the store instruction from the first appliance and stores the encrypted data in a second memory device. The second appliance receives a retrieve instruction comprising an index at which the encrypted first data is stored, processes the retrieve instruction to obtain encrypted response data, and decrypts the encrypted response data.

In some embodiments, the second appliance transmits the decrypted response data. The first appliance may receive data from at least one computer. The data may be encrypted using an algorithm such as Advanced Encryption Scheme, Data Encryption Scheme, or Triple Data Encryption Scheme. The second appliance may combine the encrypted response data with a key stream. In some embodiments, the first appliance stores the encrypted data at the index independent of an application or data context.

A method for ensuring compliance in a network memory is also disclosed. The method comprises encrypting data in a first appliance and storing the encrypted data in a first memory device. The method further comprises determining whether the encrypted data exists in a second appliance, transmitting a store instruction comprising the encrypted data from the first appliance, and receiving the store instruction into the second appliance, storing the encrypted first data in a second memory device. Additionally, the method comprises receiving a retrieve instruction indicating an index at which the encrypted first data is stored into the second memory device, in the second appliance, processing the retrieve instruction to obtain encrypted response data, and decrypting the encrypted response data.

A software product for ensuring network compliance is also disclosed. The software product comprises software operational when executed by a processor to direct the processor to encrypt data in a first appliance, store the encrypted data in a memory device, determine whether the encrypted data exists in a second appliance, and transmit a store instruction comprising the encrypted first data from the first appliance. The software is further operational when executed by a processor to receive the store instruction into the second appliance, store the encrypted data in a second memory device, receive a retrieve instruction into the second appliance, the retrieve instruction comprising an index at which the encrypted data is stored, processing the retrieve instruction to obtain encrypted response data in the second appliance, and decrypt the encrypted response data in the second appliance

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

To provide improved application performance and data access, the network memory system generally comprises a first appliance and a second appliance. The first appliance receives data and determines whether a portion of the data is locally accessible to the second appliance. The first appliance generates an instruction based on the determination and transfers the instruction to the second appliance through the communication network.

The network memory system provides that the second appliance processes the instruction to obtain the data and transfers the data to a computer. The data may be locally accessible to the second appliance, and the transfer to the computer may occur faster than transferring the data over the communication network. Accordingly, the second appliance transfers the data to computer without the first appliance transferring the data over the communication network that may have a high latency and low bandwidth. Thus, the network memory system operates to reduce latency and network traffic over the communication network.

Figure 1:
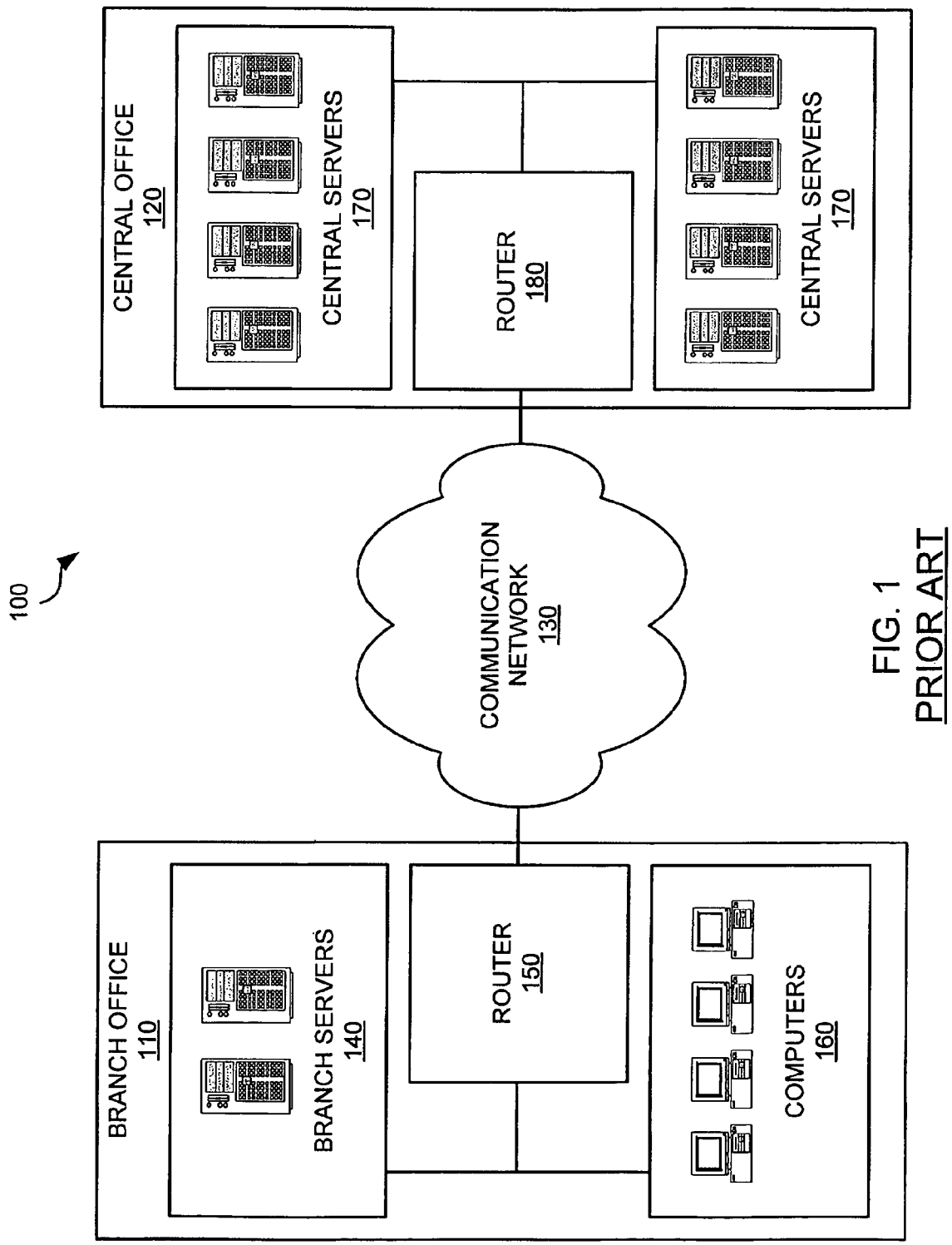
FIG. 1 illustrates a distributed server system in the prior art.
Figure 2:
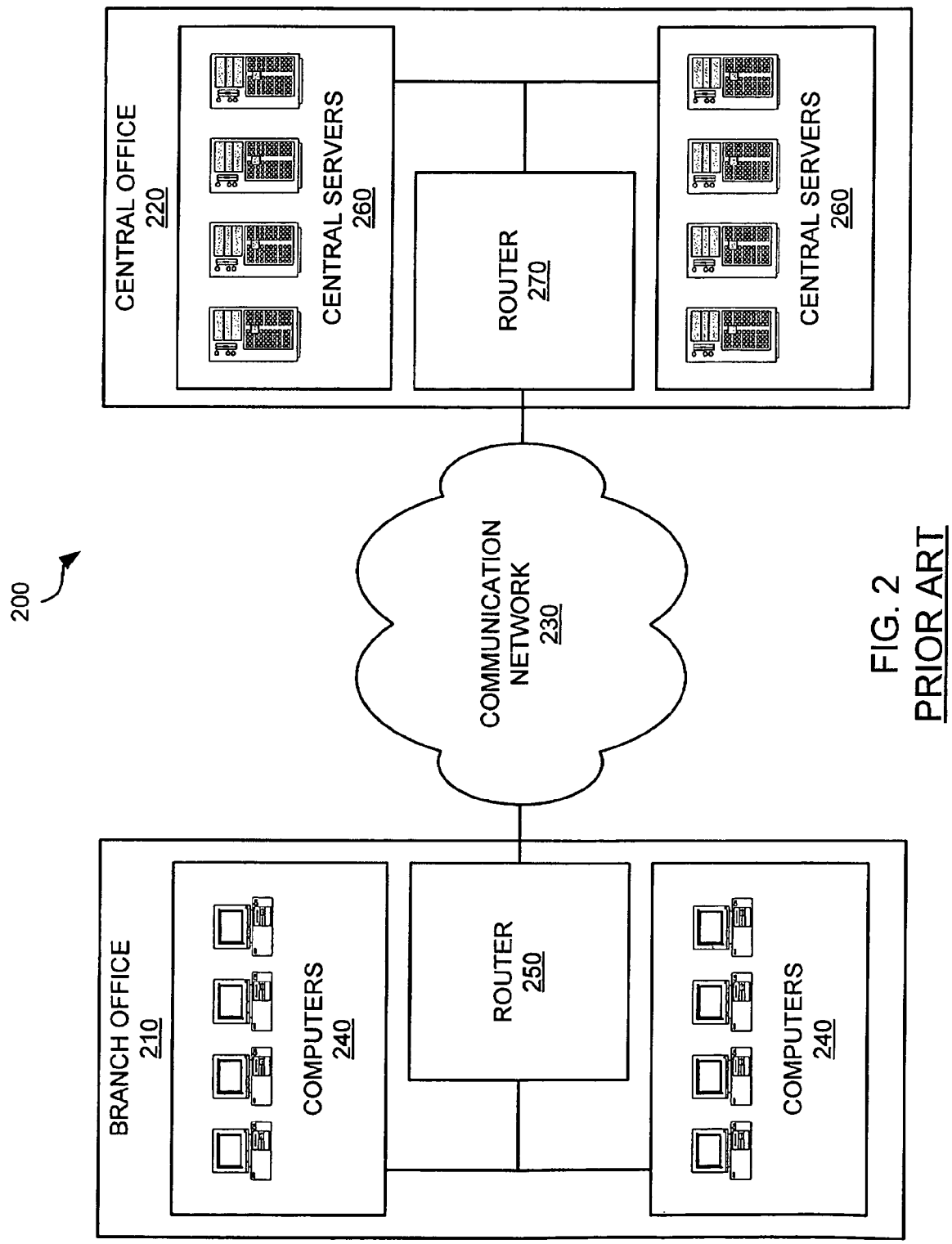
FIG. 2 illustrates a centralized server system in the prior art.
Figure 3:
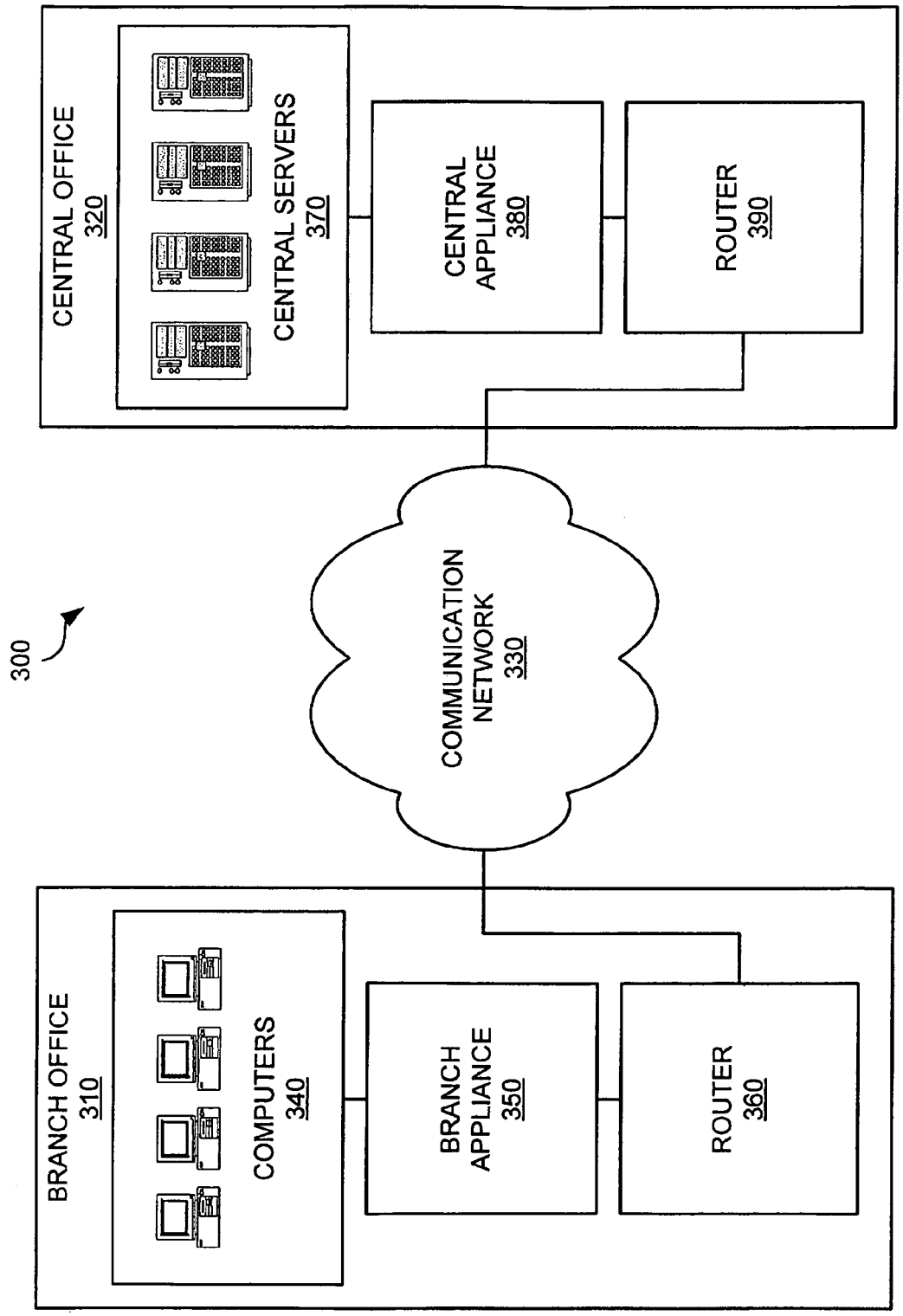
FIG. 3 illustrates a network memory system, in an exemplary implementation of the invention.

FIG. 3 illustrates a network memory system 300, in an exemplary implementation of the invention. The network memory system 300 includes a branch office 310, a central office 320, and a communication network 330. The branch office 310 includes computers 340, a branch appliance 350, and a router 360. The central office 320 includes central servers 370, a central appliance 380, and a router 390.

In the branch office 310, the computers 340 are linked to the branch appliance 350. The branch appliance 350 is linked to the router 360. The router 360 is coupled to the communication network 330. In the central office 320, the central servers 370 are linked to the central appliance 380. The central appliance 380 is linked to the router 390. The router 390 is coupled to the communication network 330.

The principles discussed herein are equally applicable to multiple branch offices (not shown) and to multiple central offices (not shown). For example, the network memory system 300 may include multiple branch offices and/or multiple central offices coupled to the communication network 330. Branch office/branch office communication and central office/central office communication, as well as multi-appliance and/or multi-node communication and bi-directional communication are further within the scope of the disclosure. However, for the sake of simplicity, the disclosure illustrates the network memory system 300 having the single branch office 310 and the single central office 320, and the respective branch office 310/central office 320 communication.

The communication network 330 comprises hardware and/or software elements that enable the exchange of information (e.g., voice and data) between the branch office 310 and the central office 320. Some examples of the communication network 330 are a private wide-area network (WAN), and the Internet. Typically connections from the branch office 310 to the communication network 330 (e.g., from the router 360 and the router 390) are ISDN, T1 lines (1.544 Mbps), and possibly broadband connections such as digital subscriber lines (DSL) and cable modems. Other examples are T3 lines (43.232 Mbps), OC3 (155 Mbps), and OC48 (2.5 Gbps), although more costly and more likely used for interconnection at the central office 320 or as the backbone of the communication network 330.

The branch appliance 350 comprises hardware and/or software elements configured to receive data (e.g., email, files, and databases transactions), determine whether a portion of the data is locally accessible to an appliance (e.g., the central appliance 380), generate an instruction based on the determination, and transfer the instruction to the appliance. The branch appliance 350 also comprises hardware and/or software elements configured to receive an instruction from an appliance (e.g., the central appliance 380), process the instruction to obtain data, and transfer the data to a computer (e.g., the computers 340). One example of the branch appliance 350 is described below with respect to FIG. 8. The operations of the branch appliance 350 are discussed in further detail below in FIGS. 4, 5, 6, and 7A-7B.

Locally accessible data comprises any data transferable to the computer (e.g., the computers 340 and the central servers 370) by an appliance (e.g., the branch appliance 350 and the central appliance 380) without transferring the data over the communication network 330. In some examples, the locally accessible data is stored in random access memory (RAM) in the branch appliance 350, on a hard drive in the branch appliance 350, and a combination of data stored in RAM and on one or more hard drives in the branch appliance 350. In another example, the locally accessible data is accessible by the branch appliance 350 over a communication network (other than the communication network 330), such as data stored in a network attached storage (NAS) device that is internal or external to the branch office 310. In still another example, the locally accessible data is stored in a database. The database may be stored in RAM, on a hard disk, a combination of RAM and hard disks, in a NAS device, and/or in other optical and flash storage devices.

The instruction comprises any message or signal that indicates to an appliance (e.g., the branch appliance 350 and the central appliance 380) an action to perform with the data. Some examples of the instruction indicate to the appliance to store the data, to retrieve the data, and to forward the data to the computer (e.g., the central servers 370 and the computers 340). The instruction may be explicit or implicit based on instructions indicating to store or retrieve the data. In some embodiments, the instruction indicates an index within a database for storing and retrieving the data.

The central appliance 380 comprises hardware and/or software elements configured to receive data, determine whether a portion of the data is locally accessible to an appliance (e.g., the branch appliance 350), generate an instruction based on the determination, and transfer the instruction to the appliance. The central appliance 380 also comprises hardware and/or software elements configured to receive an instruction from an appliance (e.g., the branch appliance 350), process the instruction to obtain the data, and transfer the data to a computer (e.g., the central servers 370). One example of the central appliance 380 is described below with respect to FIG. 9. The operations of the central appliance 380 are discussed in further detail below in FIGS. 4, 5, 6, and 7A-7B.

As illustrated, the branch appliance 350 is configured in-line (or serially) between the computers 340 and the router 360. The central appliance 380 is also configured serially between the central servers 370 and the router 390. The branch appliance 350 and the central appliance 380 transparently intercept network traffic between the computers 340 and the central servers 370. For example, the central appliance 380 transparently intercepts data sent from the central servers 370 and addressed to the computers 340. The computers 340 and the central servers 370 advantageously require no additional configuration because the branch appliance 350 and the central appliance 380 operate transparently Alternatively, the branch appliance 350 and the central appliance 380 are configured as an additional router or gateway. As a router, for example, the branch appliance 350 appears to the computers 340 as an extra hop before the router 360. In some embodiments, the branch appliance 350 and the central appliance 380 provide redundant routing or peer routing with the router 360 and the router 390. Additionally, in the bridge and router configurations, the branch appliance 350 and the central appliance 380 provide failure mechanisms, such as, fail-to-open (e.g., no data access) or fail-to-wire (e.g., a direct connection to the router 360).

It will be understood that the branch appliance 350 and the central appliance 380 perform bi-directional communication. For example, data sent to the branch appliance 350 from the central appliance 380 may be stored in a location locally accessible to the central appliance 380 and in a location locally accessible to the branch appliance 350. If the data is to be transferred again from the central appliance 380 to the branch appliance 350, the central appliance 380 may determine that the data is locally accessible to the branch appliance 350 and generate an instruction to the branch appliance 350 to retrieve the data. The central appliance 380 transfers the instruction to the branch appliance 350 and the branch appliance 350 processes the instruction to obtain the data. If later, the branch appliance 350 is to transfer the entire data back to the central appliance 380, the branch appliance 350 may use the fact that the central appliance 380 has before transferred the data to the branch appliance 350. The branch appliance 350 therefore determines that the data is locally accessible to the central appliance 380 and generates an instruction to the central appliance 380 to retrieve the data. The branch appliance 350 transmits the instruction to the central appliance 380 and the central appliance 380 processes the instruction to obtain the data. Therefore, an appliance (e.g., the branch appliance 350 and the central appliance 380) in the network memory system 300 advantageously uses data transferred to and from the appliance to reduce network traffic with other appliances in the network memory system 300.

The network memory system 300 advantageously provides increased productivity, reduced IT costs, and enhanced data integrity and compliance. For example, the network memory system 300 achieves the simple administration of centralized server systems whereby the central servers 370 store the primary copy of the data. The network memory system 300 improves application performance and data access in the branch office 310 and central office 320 because not every response to a data request travels over the communication network 330 from the central servers 370. The branch appliance 350 and the central appliance 380 also store to and retrieve from a local copy of the data for subsequent exchanges of the data.

In addition to enhanced performance, network memory system 300 provides the increased compliance of centralized server systems. The branch appliance 350 encrypts data, stores the encrypted data within the local copy in the branch appliance 350 or a NAS device, and transmits the data to the central appliance 380. The branch appliance 350 also retrieves the encrypted response data from the local copy per an instruction from the central appliance 380, decrypts the response data, and forwards the response data to the computers 340. The branch appliance 350 may also determine whether the data is locally accessible to the central appliance 380.

The central appliance 380 may likewise receive an instruction from the branch appliance 350 to store encrypted data in a local copy such that is locally accessible to the central servers 370. The central appliance 380 may receive unencrypted data from a central server 370, encrypt the data, and store the data in the local copy. The central appliance 380 is configured to determine whether the data is locally accessible to the branch appliance 350. The central appliance 380 may also transmit a store instruction and encrypted data to the branch appliance 350. The central appliance 380 is further configured to decrypt the data before transmitting the data to the central server 370. Because a master copy is stored in the central servers 370, locally accessible data is encrypted at the branch office 310 without the replication and synchronization problems of distributed server systems.

The branch appliance 350 and/or the central appliance 380 may encrypt the data using the Advanced Encryption Scheme (AES) algorithm, the Data Encryption Scheme (DES) algorithm, the Triple DES algorithm, or the like.

Additionally, the network memory system 300 does not cache the data in the traditional sense. The data may be retrieved locally even if the URL or filename for the data is different because the data may be identified by a pattern for the data itself and not by the URL or filename. Furthermore, unlike web caching, the network memory system 300 ensures that the data is coherent by forwarding messages (e.g., data requests and responses) between the computers 340 and the central servers 370. For example, web caching operates by locally intercepting messages for an authoritative source (e.g., a web server) and responding to the messages such that the web server potentially never sees the messages. In some cases, particularly with dynamic content, the locally cached copy may be stale or out-of-date. Advantageously, the network memory system 300 provides the data coherency and up-to-date data by the transparent operation of the network memory system 300 and the principle in which messages are transferred end-to-end (e.g., from the computers 340 to the central servers 370), even though the messages and/or the data may not traverse the communication network 330.

The network memory system 300 does not have the higher cost of distributed server systems because the branch appliance 350 and the central appliance 380 provide benefits across all applications and displace several distributed devices and caches, particularly in multiple branch implementations. In some embodiments, the branch appliance 350 and the central appliance 380 provide internal storage for a secondary copy of the data. The network memory system 300 also reduces the hardware and license costs for the branch office 310 and the central office 320 by eliminating the need for the numerous distributed devices. Further, the network memory system 300 minimizes the security vulnerabilities and patching activities commonly associated with the distributed systems. Management of the branch appliance 350 and the central appliance 380 is simpler than the management of a remote distributed server. Unlike remote servers, there is no need to configure user accounts, permissions, and authentication schemes on the branch appliance 350 and the central appliance 380.

Figure 4:
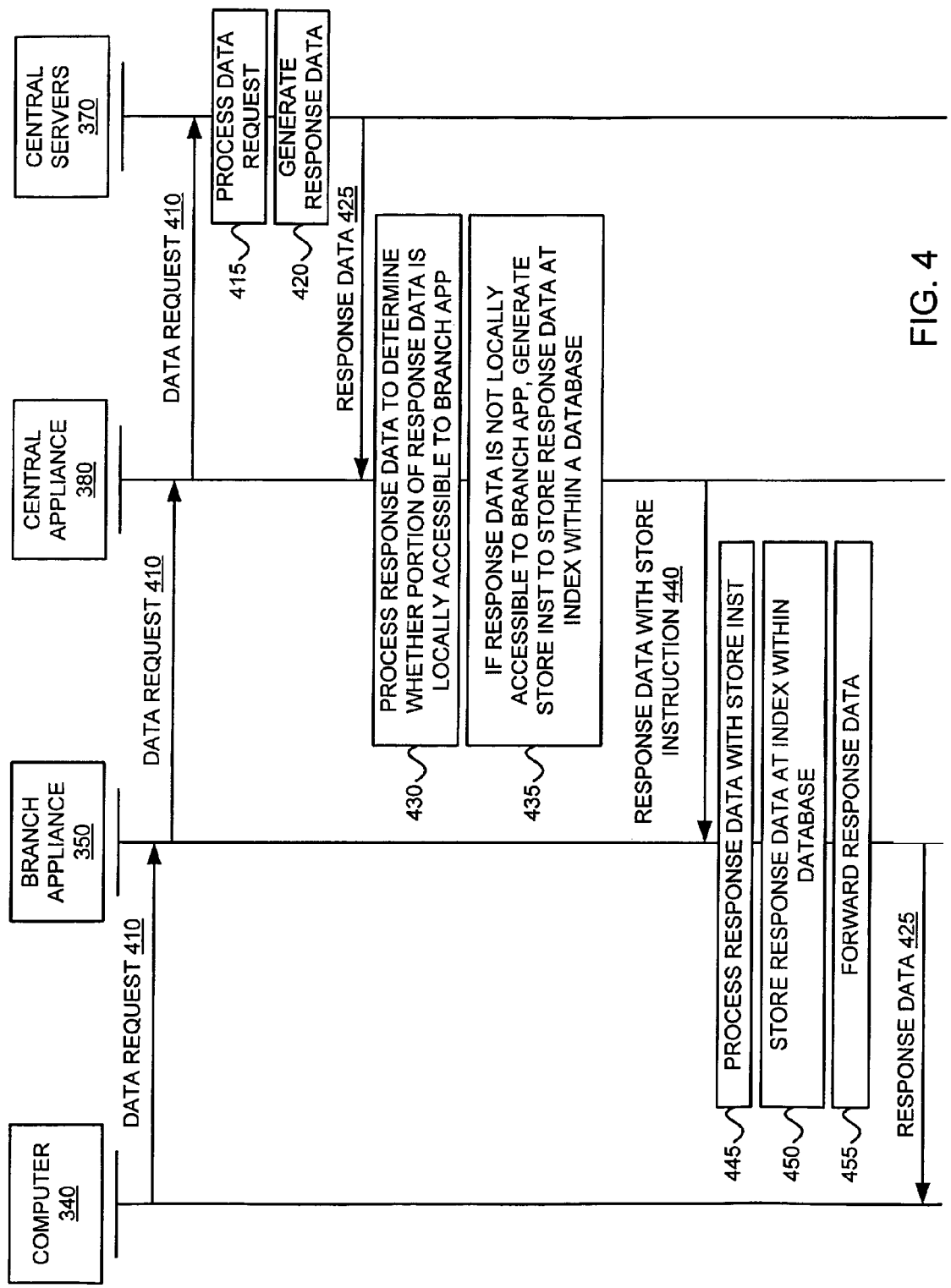
FIG. 4 illustrates a message sequence chart for the network memory system where a response to a data request is not locally accessible to a branch appliance, in an exemplary implementation of the invention.

FIG. 4 illustrates a message sequence chart for the network memory system 300 where a response data 425 to a data request 410 is not locally accessible to the branch appliance 350, in an exemplary implementation of the invention. In this example, the computer 340 transmits the data request 410 through the branch appliance 350 and the central appliance 380 to the central server 370. Some examples of the data request 410 are requests for an email attachment, a file, a web page, and a database query.

In sequence 415, the central servers 370 process the data request 410, and in sequence 420, the central servers 370 generate the response data 425 based on the data request 410. Some examples of the response data 425 are an email message and attachment, a file, a web page, and results retrieved or obtained from the database query. The central servers 370 then transmit the response data 425 to the central appliance 380. Alternatively, in some embodiments, the central servers 370 address the response data 425 directly to the computers 340, however, during transmission, the central appliance 380 transparently intercepts the response data 425. In sequence 430, the central appliance 380 processes the response data 425 to determine whether a portion of the response data 425 is locally accessible to the branch appliance 350.

Figure 5:
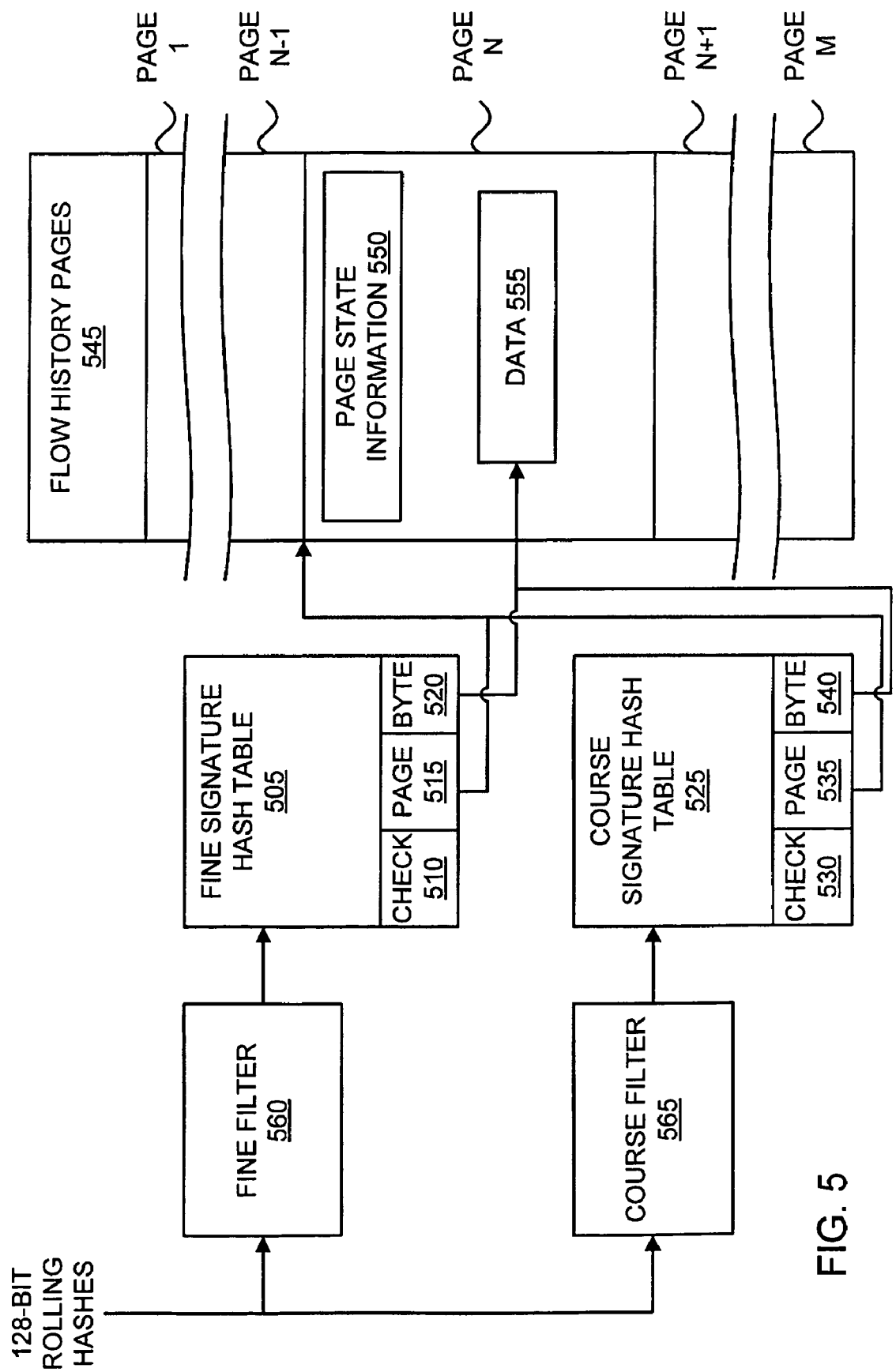
FIG. 5 illustrates data structures for the network memory system to determine whether a portion of the data is locally accessible to the branch appliance, in an exemplary implementation of the invention.

FIG. 5 illustrates data structures for the network memory system 300 to determine whether a portion of the data is locally accessible to the branch appliance 350, in an exemplary implementation of the invention. The data structures include a fine signature hash table (SHT) 505, a coarse signature hash table (SHT) 525, and flow history pages (FHPs) 545. The fine SHT 505 includes one or more entries comprising a check field 510, a page field 515, and a byte field 520. The coarse SHT 525 includes one or more entries comprising a check field 530, a page field 535, and a byte field 540. The FHPs 545 include one or more pages (e.g., page 1-M). Each page (e.g., page N) includes page state information 550 and stores data 555. The FHPs 545 may be encrypted using the Advanced Encryption Scheme (AES) algorithm, the Data Encryption Scheme algorithm (DES), the Triple DES algorithm, or the like.

An appliance of the network memory system 300 (e.g., the branch appliance 350 and the central appliance 380) calculates hashes at every byte boundary of a data flow (e.g., the response data 425) to be sent across the communication network 330. In some embodiments, the data flow includes packets that are in the same Internet Protocol (IP) flow, as defined by the IP header five tuple of source address, source port, destination address, destination port, and protocol. The hashes may be influenced by preceding bytes in the data flow. For example, the hashes are influenced by approximately the n previous bytes, where n determines the fingerprint size. Some examples of calculating the hashes are cyclical redundancy checks (CRCs) and checksums over the previous n bytes of the data flow. In some embodiments, rolling implementations of CRCs and checksums are used where a new byte is added, and a byte from n bytes earlier is removed. To maximize the ability to determine whether a portion of the data flow exists in another appliance in the network memory system 300, the hash calculation may span across successive IP packets in the data flow. In other embodiments, the hash calculation ignores patterns that span one or more IP packet boundaries in the data flow, and the hashes are calculated within a single IP packet.

Each calculated hash is filtered by a fine filter 560 and a coarse filter 565. The appliance designates the locations in the data flow which meet the fine and coarse filter criteria as fine and coarse sync-points, respectively. The fine filter 560 and the coarse filter 565 have different filter criteria. Typically, the filter criteria for the coarse filter 565 are more restrictive and may be used to further filter those hashes which pass the fine filter. In other words, the fine filter produces a fine comb of sync-points and the coarse filter produces a coarse comb of sync-points. One example of the filter criteria is the null filter which allows results in sync-points at all locations. In another example, the filter criteria declares a fine sync-point when the top five bits of the hashes are all zeros and a coarse filter criteria which stores or compares hashes when the top ten bits of the hashes are all zeros. The hash at the fine sync-points index the fine SHT 505 and the hash at the coarse sync-points index the coarse SHT 525. For example, the index could be derived from the hash by using a number of low order bits from the hash. The filter criteria affect the sizing of the SHTs 505 and 525 and the probability of matching a hash in the SHTs 505 and 525. The more sync-points that are generated the easier repeated data is identified but, the larger the tables (i.e., the SHTs 505 and 525) need to be in order to index a given amount of information for the data flow. Having a coarse and fine table helps optimize this tradeoff. Alternative implementations may use a single table or multiple tables.

The fine SHT 505 is populated with hashes as the data 555 (e.g., the response data 425) is stored and when the data 555 is recalled from disk or other locally accessible storage. The fine SHT 505 finely indexes the data 555. In some embodiments, the fine SHT 505 holds approximately one entry for every 100 bytes of the data 555. The coarse SHT 525 is populated as the data 555 is stored and is coarsely indexed. For example, the coarse SHT 525 may hold one entry for approximately every 4 kilobytes (KB) of the data 555. The fine SHT 505 and the coarse SHT 525 may be considered short term and long term memory index structures, respectively.

The appliance of the network memory system 300 stores all or part of the calculated hashes in or compares all or part of the hashes to the check field 510 in the SHTs 505 and 525. For example, the central appliance 380 verifies a "hit" in the fine SHT 505 by comparing the entire calculated hash or a number of residual bits of the calculated hash to the check field 510. If the central appliance 380 finds no matching hashes in the fine SHT 505 or in the coarse SHT 525, the central appliance 380 determines that the response data 425 is not locally accessible to the branch appliance 350. Each calculated hash for the response data 425 in the fine SHT 505 and the coarse SHT 525 is stored or compared depending on the filter criteria for the fine filter 560 and the coarse filter 565.

The appliance of the network memory system 300 indexes each entry in the fine SHT 505 and the coarse SHT 525 to a page (e.g., by setting the page field 515 and the page field 535 to address page N) and byte offset (e.g., by setting the byte field 520 and the byte field 540 to a byte offset of the data 555) in the FHPs 545. For example, the central appliance 380 stores the response data 425 in the FHPs 545 at the page pointed to by the page field 515 and 535 at the byte offset indicated by the byte field 520 and 540. The byte field 520 of each hash in the fine SHT 505 for the response data 425 points to the start of a fine sync-point. The byte field 540 of each hash in the coarse SHT 525 for the response data 425 points to the start of a coarse sync-point.

In this example, the branch appliance 350 includes a fine SHT 505, a coarse SHT 525, and a FHP 545 data structure, and the central appliance 380 includes a fine SHT 505, a coarse SHT 525, and a FHP 545 data structure. Each appliance in the network memory system 300 maintains the separate data structures, with may include separate filter criteria for the fine filter 560 and the coarse filter 565. The page state information 550, in the FBP 545 of each appliance in the network memory system 300, includes page parameters, page ownership permissions, peer state, and a list of valid byte ranges for each appliance in the network memory system 300. The page state information 550 tracks the local state of the page (e.g., the FHP 545 in the branch appliance 350, and what parts of the page are used) and the remote state of the page at peers (e.g., the central appliance 380, and what part of the page in the branch appliance 350 is used by the central appliance 380).

The branch appliance 350 and the central appliance 380 each write the data 555 to an assigned page (e.g., the page N or the page N+1) and may reference a page assigned to another appliance in the network memory system 300. Appliances in the network memory system 300 may discover and reconcile the FHPs 545 assigned to other appliances as explained below with regard to FIGS. 9 and 10.

Referring again to FIG. 4, the central appliance 380 proceeds with the determination that no portion of the response data 425 is locally accessible to the branch appliance 350. In sequence 435, the central appliance 380 generates a store instruction 440. The store instruction 440 indicates to the branch appliance 350 to store the response data 425 at an index in a database. The central appliance 380 attaches the store instruction 440 to the response data 425. The central appliance 380 then transmits the response data 425, which may be encrypted, with the store instruction 440 to the branch appliance 350.

In sequence 445, the branch appliance 350 processes the response data 725 with the store instruction 440. In sequence 450, based on the store instruction 440, the branch appliance 350 stores the response data 425 in the branch appliance 350 at the index within the database. In this example, the branch appliance 350 stores the response data 425 in the FHPs 545 at the page and at a particular byte offset indicated by the index. Sequence 450 additionally includes encrypting the FHPs 545. In sequence 455, the branch appliance 350 forwards the response data 425 to the computers 340. As discussed previously, the branch appliance 350 may forward the data to the computer based on explicit and implicit instructions.

Figure 6:
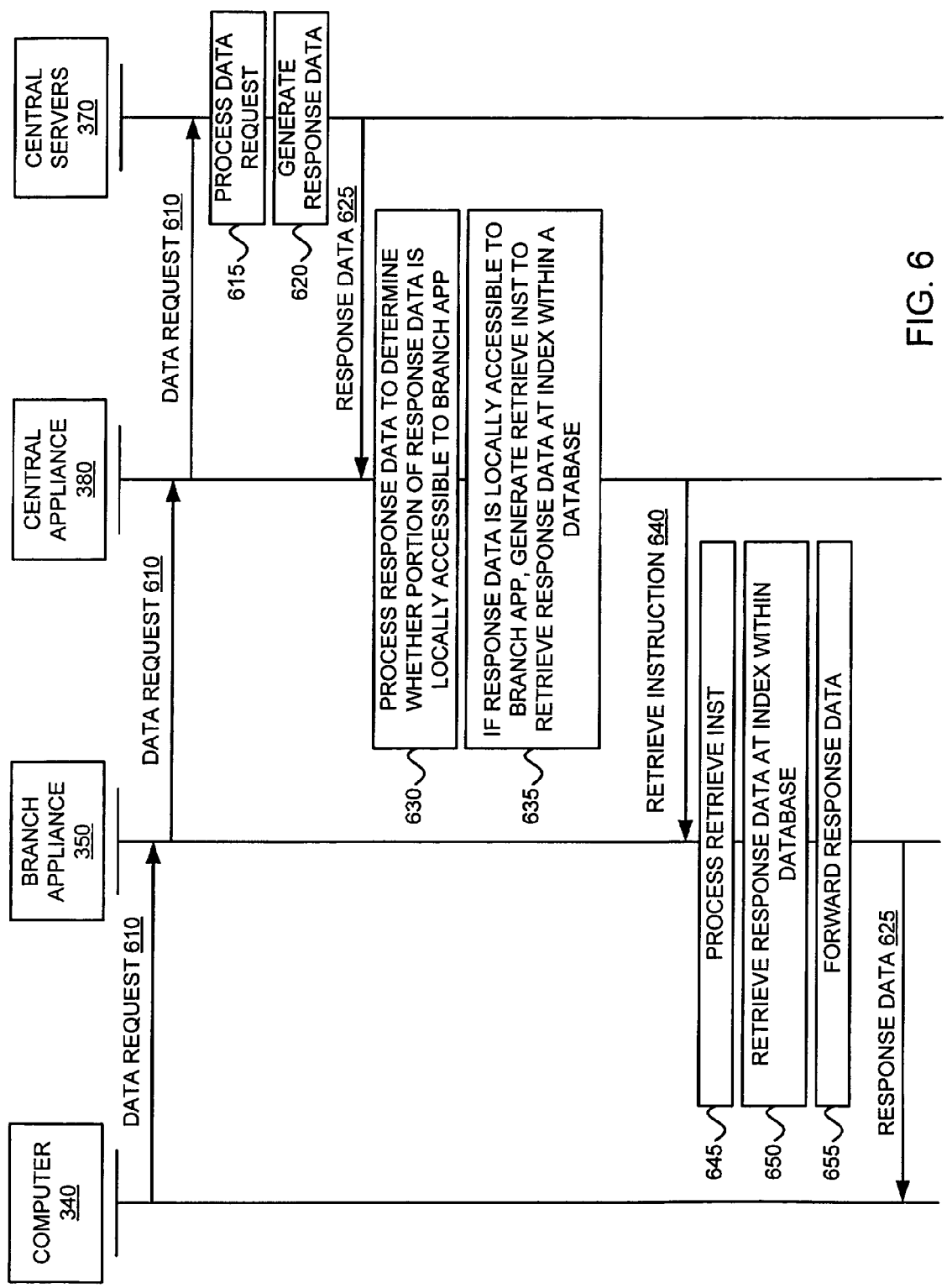
FIG. 6 illustrates a message sequence chart for the network memory system where the response to the data request is locally accessible to the branch appliance, in an exemplary implementation of the invention.

FIG. 6 illustrates a message sequence chart for the network memory system 300 where a response data 625 to a data request 610 is locally accessible to the branch appliance 350, in an exemplary implementation of the invention. In this example, the computer 340 transmits the data request 610 to the central servers 370 through the branch appliance 350 and the central appliance 380. In sequence 615, the central servers 370 process the data request 610. In sequence 620, the central servers 370 generate a response data 625 based on the data request 610. The central servers 370 then transmit the response data 625 to the central appliance 380.

In sequence 630, the central appliance 380 processes the response data 625 to determine whether a portion of the response data 625 is locally accessible to the branch appliance 350. The central appliance 380 again generates hashes for the response data 625, as previously described with respect to FIGS. 4 and 5. The central appliance 380 filters the generated hashes through the fine filter 560 and the coarse filter 565 to determine fine and/or coarse sync-points. The central appliance 380 looks up the fine sync-points in the fine SHT 505 and the coarse sync-points in the coarse SHT 525. If any of the hashes for the response data 625 match (i.e., the check bytes match in either the fine SHT 505 and/or the coarse SHT 525), then additional checks (such as direct forward comparisons and backward memory comparisons between the response data 625 and the data 555 in the FHPs 545) may also be made to determine the size of the matching region. Further checks using the page state information 550 determine which portion of the response data 625 is locally accessible to the branch appliance 350.

Based on the determination that the entire response data 625 is locally accessible to the branch appliance 350, in sequence 635, the central appliance 380 generates a retrieve instruction 640 that indicates to the branch appliance 350 to retrieve the response data 625 at an index within the database. The central appliance 380 then transmits only the retrieve instruction 640 to the branch appliance 350. In this manner, the central appliance 380 optimizes network traffic over the communication network 330. If the retrieve instruction 640 is smaller in size than the response data 625, the central appliance 380 transmits the retrieve instruction 640. If the retrieve instruction 640 is larger than the response data 625, the central appliance 380 transmits the response data 625 instead.

In sequence 645, the branch appliance 350 processes the retrieve instruction 640. In sequence 650, based on the retrieve instruction 640, the branch appliance 350 retrieves the response data 625 at the index within the database. Sequence 650 includes decrypting the FHPs 545 in which the response data 625 is stored. In sequence 655, the branch appliance 350 forwards the response data 625 to the computers 340.

Figure 7A:
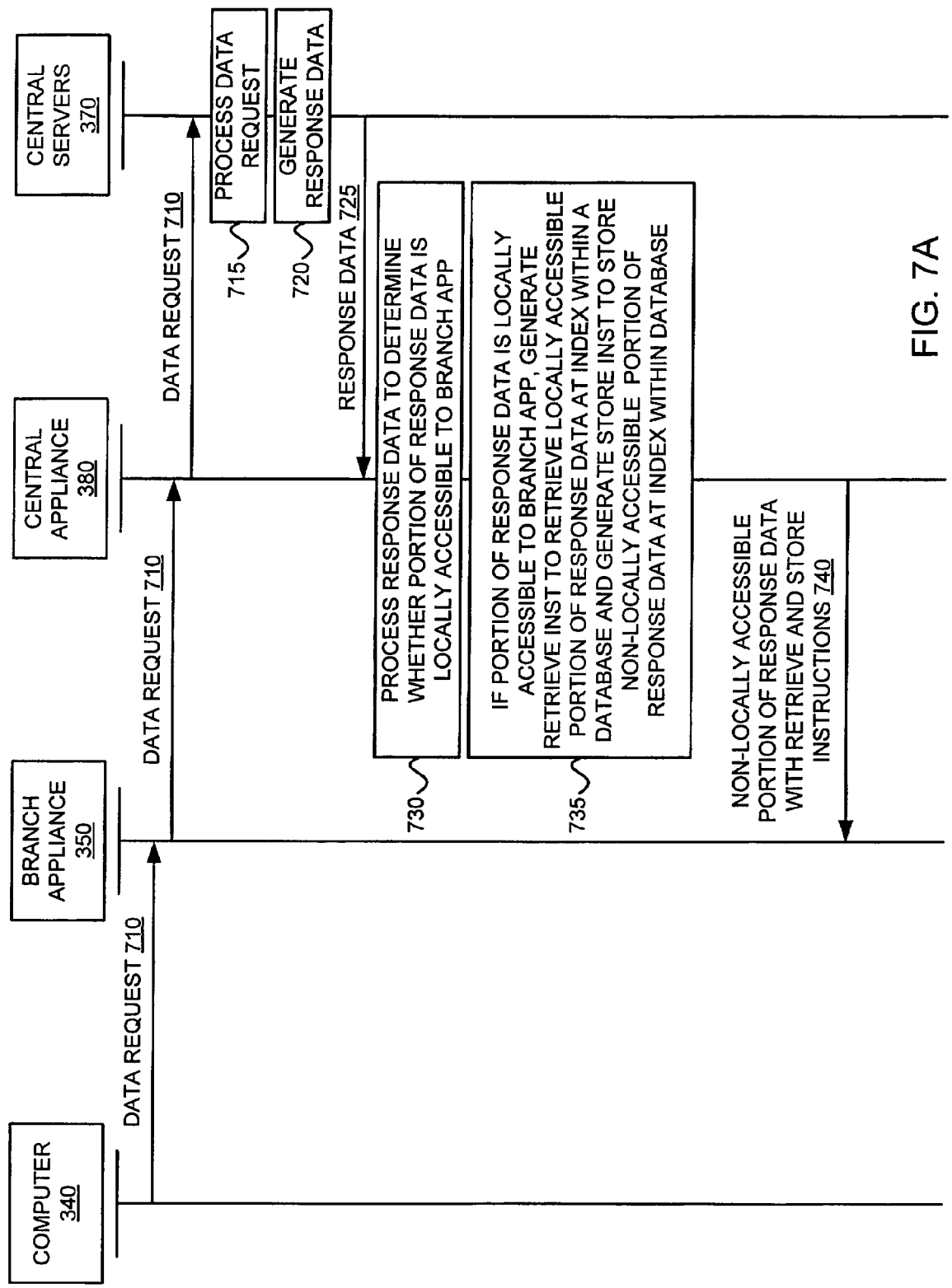
FIG. 7A and FIG. 7B illustrate a message sequence chart for the network memory system where a portion of the response to the data request is locally accessible to the branch appliance, in an exemplary implementation of the invention.
Figure 7B:
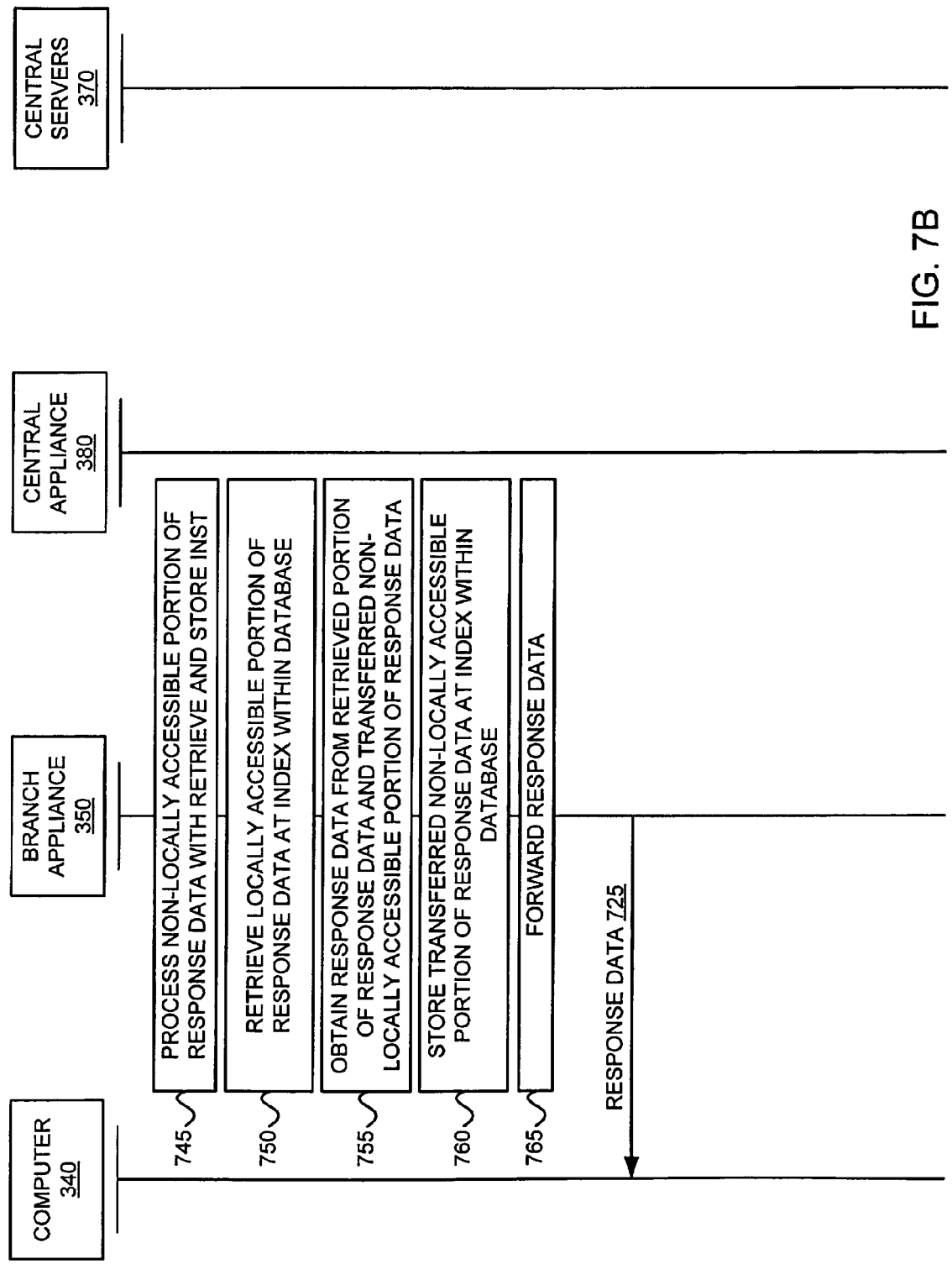

FIG. 7A and FIG. 7B illustrate a message sequence chart for the network memory system 300 where a portion of a response data 725 to a data request 710 is locally accessible to the branch appliance 350, in an exemplary implementation of the invention. The computer 340 transmits the data request 710 to the central servers 370 through the branch appliance 350 and the central appliance 380. In sequence 715, the central servers 370 process the data request 710. In sequence 720, the central servers 370 generate a response data 725 based on the data request 710. The central servers 370 then transmit the response data 725 to the central appliance 380.

In sequence 730, the central appliance 380 processes the response data 725 to determine whether a portion of the response data 725 is locally accessible to the branch appliance 350. The central appliance 380 computes hashes for the response data 725 and filters the hashes through the fine filter 560 and the coarse filter 565 to determine any fine and coarse sync-points. The central appliance 380 then looks up any fine sync-points in the fine SHT 505 and coarse sync-points in the coarse SHT 525. In this example, only a portion of the response data 725 is locally accessible to the branch appliance 350, meaning that although the central appliance 380 finds at least one match in the SHTs 505 and 525, additional checks (such as the direct forward comparison and the backward memory comparison with the response data 725 and the data 555) determine that only a portion of the response data 725 is locally accessible to the branch appliance 350.

The central appliance 380 stores the generated hashes for the non-locally accessible portion of the response data 725 (otherwise known as the deltas) in the SHTs 505 and 525, and stores the deltas in the FHPs 545. The central appliance 380 additionally encrypts the FHPs 545. The central appliance 380 will transmit the deltas (i.e., the portion of the response data 725 that is not locally accessible) to the branch appliance 350.

In sequence 735, the central appliance 380 generates retrieve and store instructions 740. The retrieve instruction indicates to the branch appliance 350 to retrieve the locally accessible portion of the response data 725 at an index within the database. The store instruction indicates to the branch appliance 350 to store the deltas at an index within the database. The store instruction may also indicate to the branch appliance 350 to store another copy of the portion of the response data 725 locally accessible to the branch appliance 350 with the deltas. The entire response data 725 will then be locally accessible in the database to the branch appliance 350. The central appliance 380 attaches the deltas to the retrieve and store instructions 740. The central appliance 380 then transmits the non-locally accessible portion of the response data 725 with retrieve and store instructions 740 to the branch appliance 350.

In sequence 745, the branch appliance 350 processes the non-locally accessible portion of the response data 725 with retrieve and store instructions 740. In sequence 750, based on the retrieve instruction, the branch appliance 350 retrieves the locally accessible portion of the response data 725 at the index in the database. In sequence 755, the branch appliance 350 obtains the response data 725 from the retrieved locally accessible portion and the transferred deltas (i.e., the transferred non-locally accessible portion of the response data 725). To obtain the data, the branch appliance 350 decrypts the response data 725. In sequence 760, based on the store instruction, the branch appliance 350 stores the deltas (and potentially the retrieve locally accessible portion of the response data 725) at the index in the database. If the deltas are not encrypted, the branch appliance 350 further encrypts the deltas. In sequence 765, the branch appliance 350 transmits the entire response data 725 to the computers 340.

Alternatively, in addition to the examples in FIGS. 4, 5, 6, and 7A-7B illustrating a request for the data originating from the computer 340 to the central servers 370, the computer 340 may also transmit data to the branch appliance 350 addressed to the central servers 370. The branch appliance 350 determines whether a portion of the data is locally accessible to the central appliance 380. Then, for example, if the data is locally accessible the central appliance 380, the branch appliance 350 generates a retrieve instruction indicating to the central appliance 380 to retrieve the data and forward the data to the central servers 370.

In still further embodiments, the instruction may indicate a plurality of indexes. Referring again to FIG. 7B, in sequence 750, based on the retrieve instruction indicating a plurality of indexes for the response data 725, the branch appliance 350 may retrieve the locally accessible portion of the response data 725 at different locations based on the plurality of index. For example, the branch appliance 350 may retrieve a portion of the response data 725 from RAM, a portion from a hard disk, and a portion from a NAS device. Similarly, in sequence 760, based on the store instruction indicating a plurality of indexes for the response data 725, the branch appliance 350 may stores the deltas in the database and after obtaining the entire response data 725, store the entire response data 725 in a different location (e.g., in a different location in the database, in a disk drive, or in a NAS device) than the previously locally accessible portion.

Figure 8:
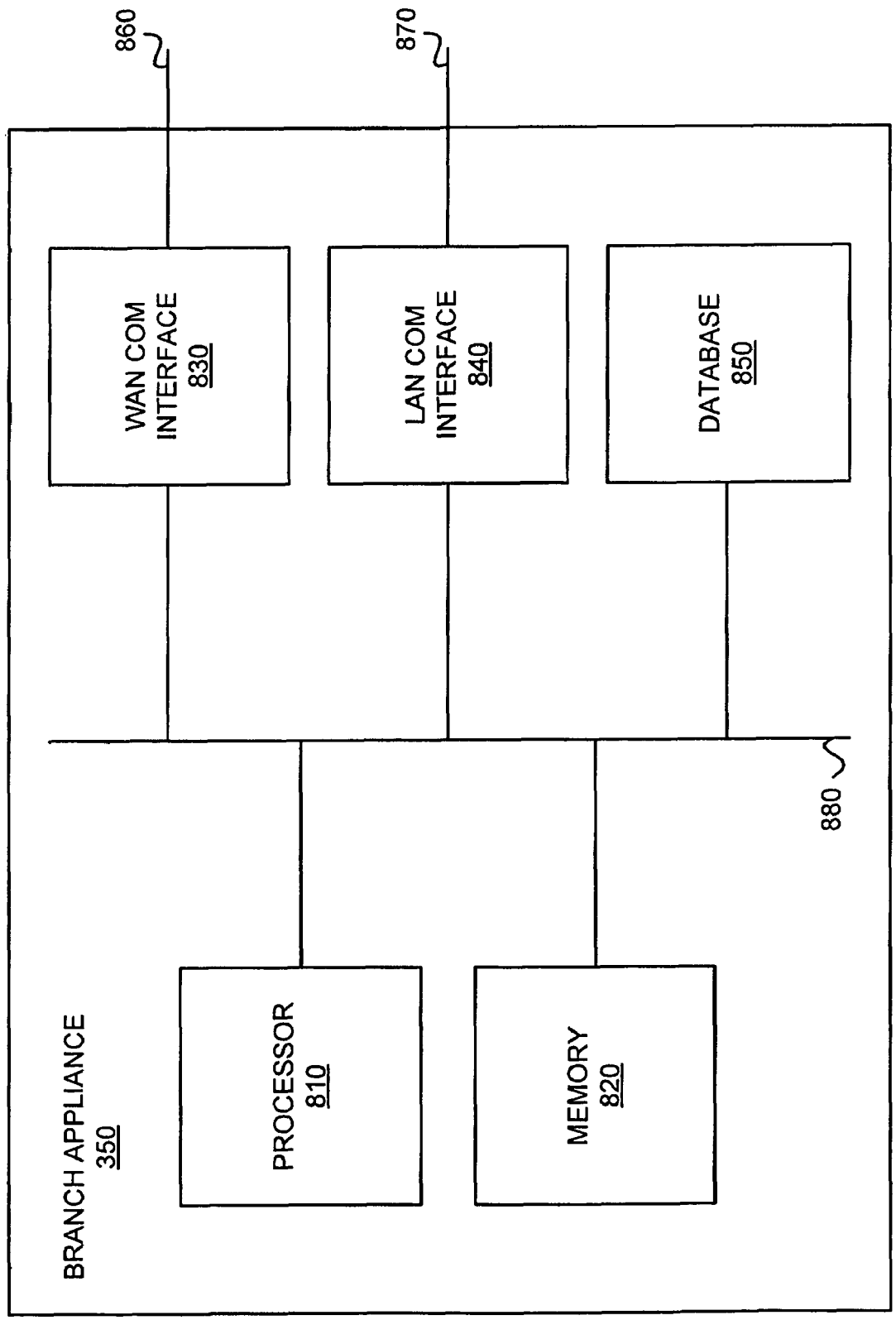
FIG. 8 illustrates a block diagram of the branch appliance, in an exemplary implementation of the invention.

FIG. 8 illustrates a block diagram of the branch appliance 350, in an exemplary implementation of the invention. The branch appliance 350 includes a processor 810, a memory 820, a WAN communication interface 830, a LAN communication interface 840, and a database 850. A system bus 880 links the processor 810, the memory 820, the WAN communication interface 830, the LAN communication interface 840, and the database 850. Line 860 links the WAN communication interface 830 to the router 360 (in FIG. 3). Line 870 links the LAN communication interface 840 to the computers 340 (in FIG. 3).

The database 850 comprises hardware and/or software elements configured to store data in an organized format to allow the processor 810 to create, modify, and retrieve the data. The database 850 may organize the data to enable the determination of whether a portion of the data is locally accessible to an appliance, and to enable quick retrieval of locally accessible data to the branch appliance 350. The hardware and/or software elements of the database 850 may include storage devices, such as RAM, hard drives, optical drives, flash memory, and magnetic tape. In some embodiments, the branch appliance 350 implements a virtual memory system with linear addresses, the locally accessible data, and the data structures discussed with respect to FIG. 5 in the database 850.

Figure 9:
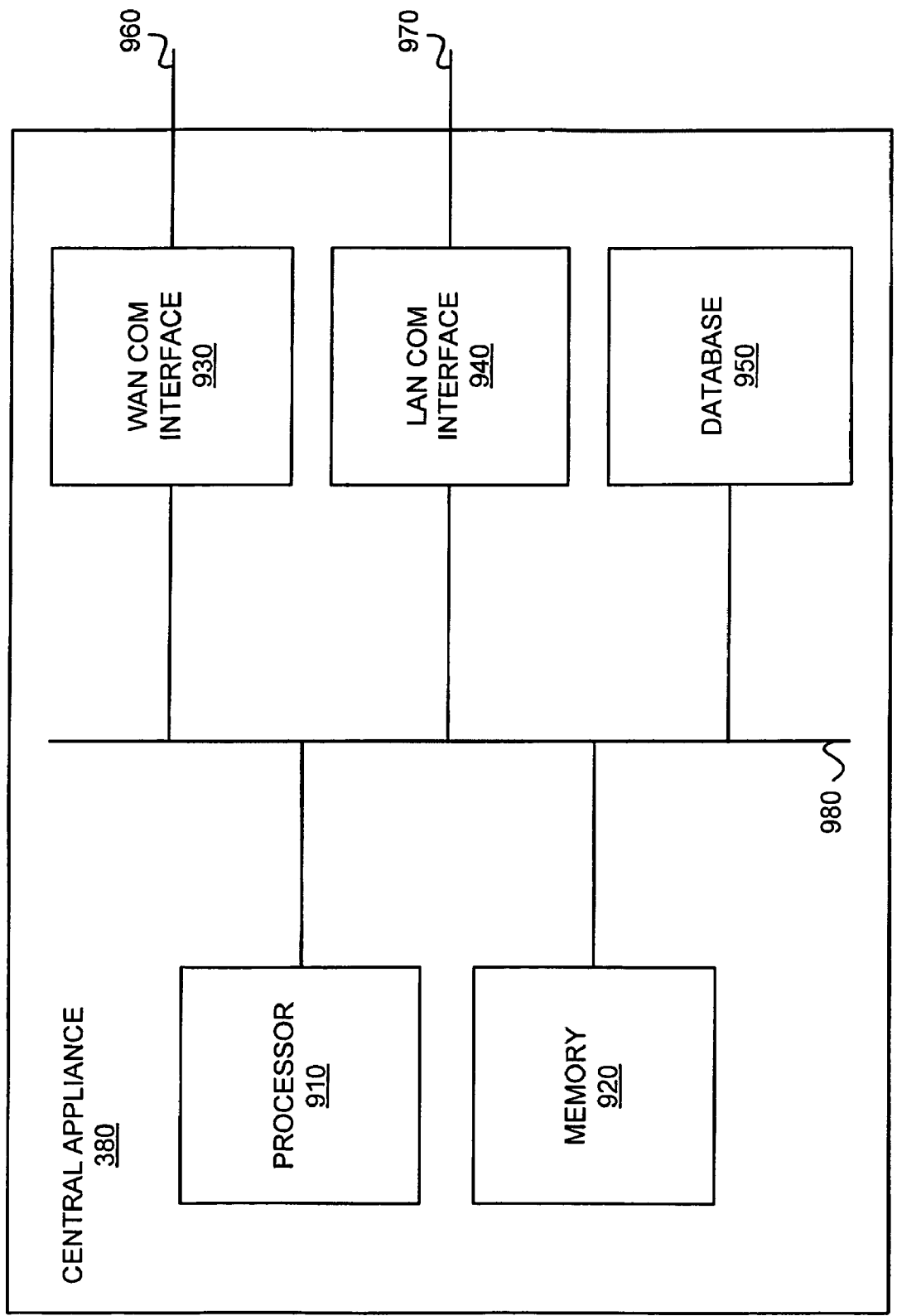
FIG. 9 illustrates a block diagram of a central appliance, in an exemplary implementation of the invention.

FIG. 9 illustrates a block diagram of the central appliance 380, in an exemplary implementation of the invention. The central appliance 380 includes a processor 910, a memory 920, a WAN communication interface 930, a LAN communication interface 940, and a database 950. A system bus 980 links the processor 910, the memory 920, the WAN communication interface 930, the LAN communication interface 940, and the database 950. Line 960 links the WAN communication interface 930 to the router 390 (in FIG. 3). Line 970 links the LAN communication interface 940 to the central servers 370 (in FIG. 3). In some embodiments, the branch appliance 350 and the central appliance 380 comprise the identical hardware and/or software elements. Alternatively, in other embodiments, the central appliance 380 may include hardware and/or software elements providing additionally processing, communication, and storage capacity.

Advantageously, the network memory system 300 improves application performance and data access. In some embodiments, by storing a secondary copy of the data locally accessible to the branch appliance 350 and the central appliance 380, the network memory system 300 minimizes the effects of latency and reduces network traffic over the communication network 330 to the central servers 370. Additionally, while the central servers 370 maintain the primary copy of the data, the central servers 370 potentially do not transfer the actual data over the communication network 330 for every request/response. Furthermore, accelerated access to the data locally accessible to the branch appliance 350 and the central appliance 380 is not limited to a particular application or data context.

In some embodiments, the network memory system 300 includes a secure tunnel between the branch appliance 350 and the central appliance 380. The secure tunnel provides encryption (e.g., Psec) and access control lists (ACLs). Additionally, in other embodiments, the secure tunnel includes compression, such as header and payload compression. The secure tunnel may provide fragmentation/coalescing optimizations along with error detection and correction.

Figure 10:
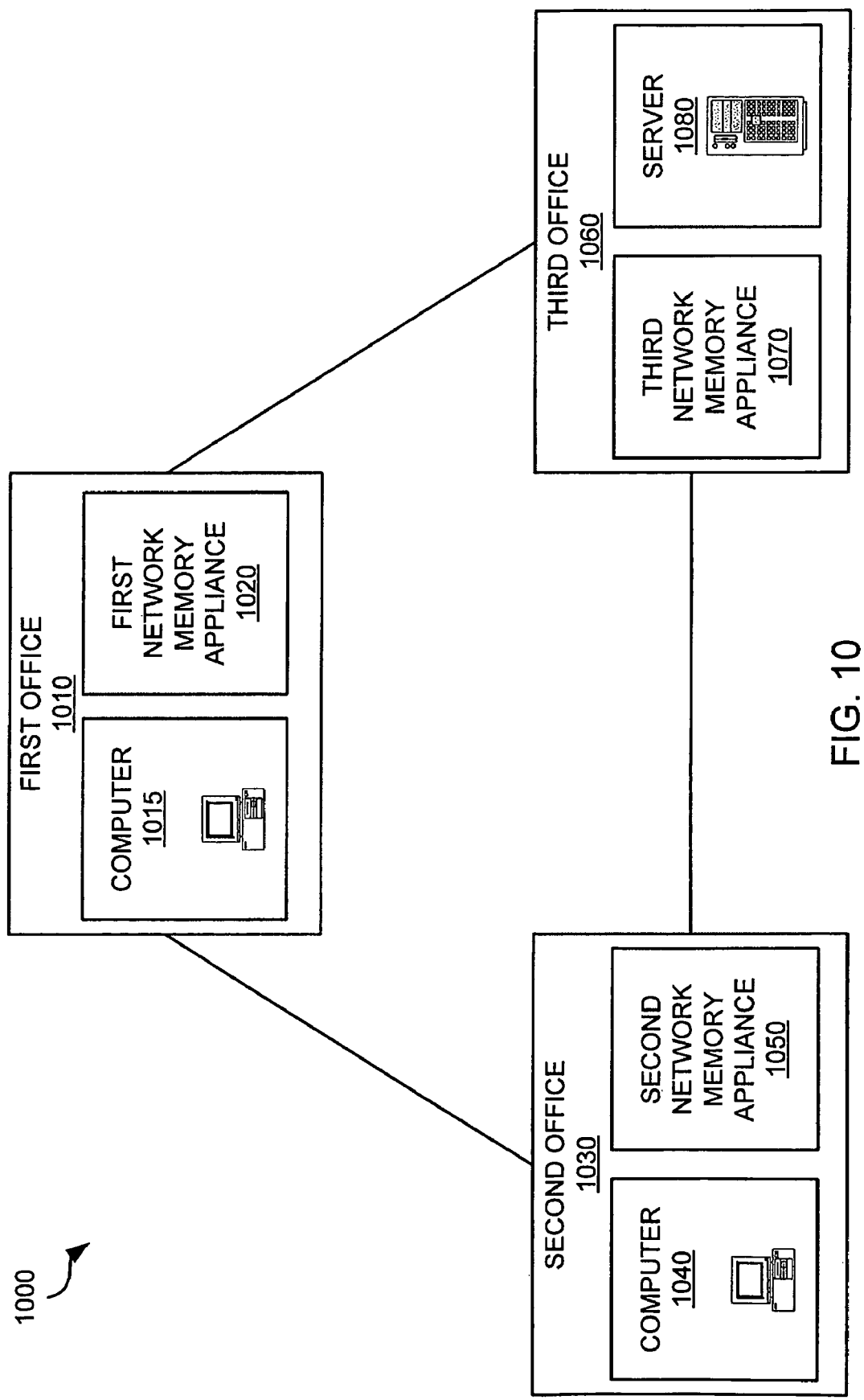
FIG. 10 illustrates a network memory system between a first office, a second office, and a third office, in an exemplary implementation of the invention.

FIG. 10 illustrates a network memory system 1000 between a first office 1010, a second office 1030, and a third office 1060, in an exemplary implementation of the invention. The first office 1010 includes a computer 1015 and a first network memory appliance (NMA) 1020. The second office 1030 includes a computer 1040 and a second NMA 1050. The third office 1060 includes a third NMA 1070 and a server 1080. The first office 1010 is linked to the second office 1030 and the third office 1060 (e.g., through routers not shown). The second office 1030 is also linked the third office 1060.

The first NMA 1020, the second NMA 1050, and the third NMA 1070 comprise hardware and/or software elements, similar to the branch appliance 350 and the central appliance 380, configured to receive data, determine whether the data is locally accessible to an appliance, generate an instruction based on the determination, and transfer the instruction to the appliance. The first NMA 1020, the second NMA 1050, and the third NMA 1070 also comprise hardware and/or software elements configured to receive an instruction from an appliance, process the instruction to obtain data, and transfer the data to a computer.

Advantageously, in this multi-office example, the network memory system 1000 provides for locally accessible data in each office. The first NMA 1020, the second NMA 1050, and the third NMA 1070 receive data, potentially destined for a computer and/or server in another office, and determine whether a portion of the data is locally accessible to an NMA in that office. To further enhance operation and the exchange of data between the first NMA 1020, the second NMA 1050, and the third NMA 1070, each NMA performs a discovery and reconciliation. During discovery and reconciliation the virtual memory map of the network memory system 1000 is updated. For example, each NMA updates the pages of the FHPs 545 in the NMA with references for data locally accessible in the network memory system 1000 and to which NMA the data is locally accessible.

Figure 11:
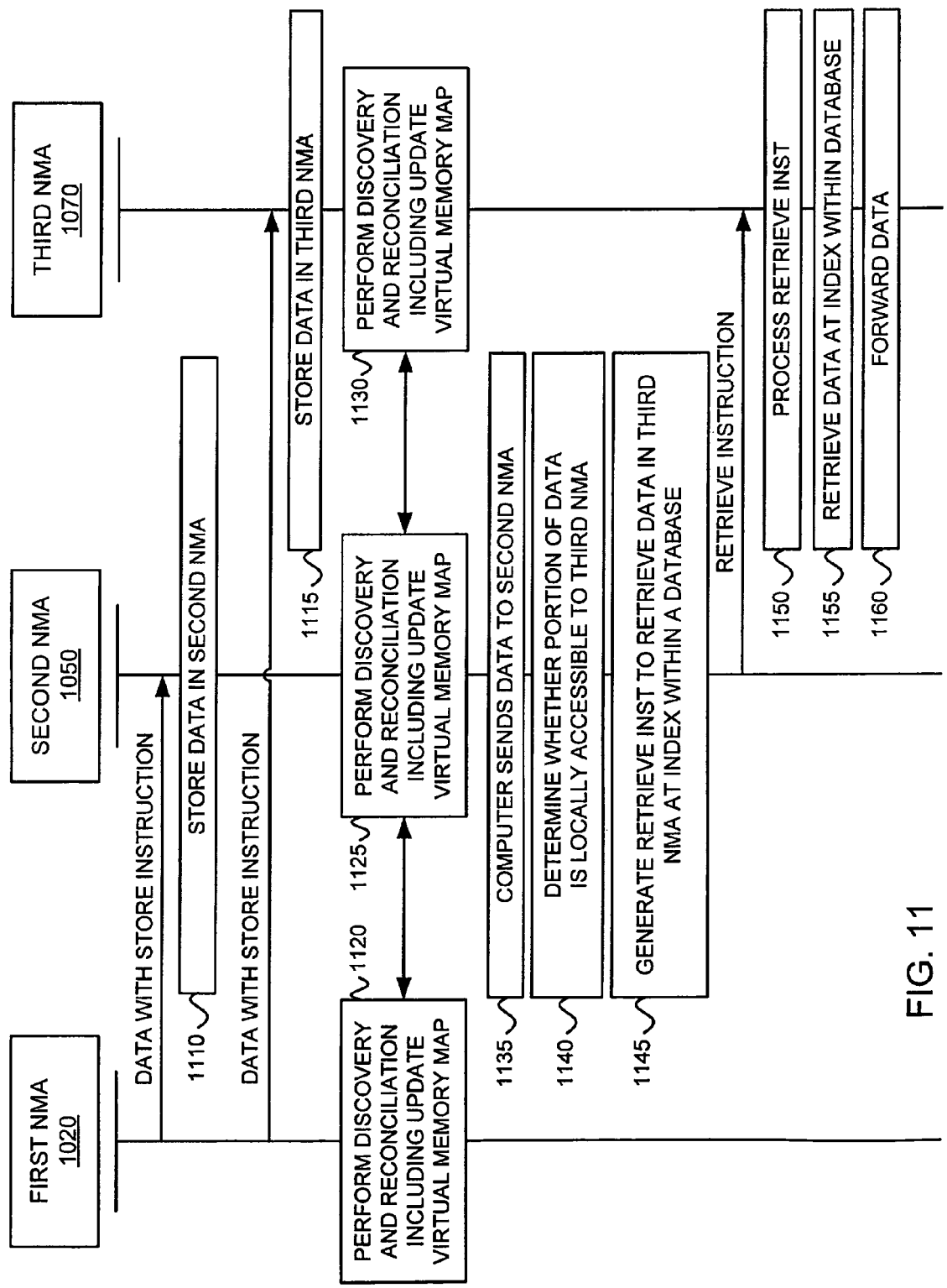
FIG. 11 illustrates a message sequence chart for the network memory system for discovery and reconciliation, in an exemplary implementation of the invention.

FIG. 11 illustrates a message sequence chart for the network memory system 1000 for discovery and reconciliation, in an exemplary implementation of the invention. In this example, the computer 1015 in the first office 1010 transmits data to the first NMA 1020 for the first time addressed to the computer 1040 in the second office 1030. The first NMA 1020 transmits the data with a store instruction to the second NMA 1050 indicating to store the data in a database in the second NMA 1050. In sequence 1110, the second NMA 1050 stores the data in the database, and the second NMA 1050 transmits the data to the computer 1040.

The computer 1015 in the first office 1010 then transmits the same data to the first NMA 1020 addressed for the first time to the server 1080 in the third office 1060. The first NMA 1020 transmits the data with a store instruction to the third NMA 1070 indicating to store the data in a database in the third NMA 1070. In the sequence 1115, the third NMA 1070 stores the data in the database, and the third NMA 1070 transmits the data to the server 1080.

In sequence 1120, 1125, and 1130, the first NMA 1020, the second NMA 1050, and the third NMA 1070 perform discovery and reconciliation including update the virtual memory map. In this example, the first NMA 1020, the second NMA 1050, and the third NMA 1070 exchange information (e.g., the page state information 550) about which parts of the FHPs 545 each NMA has available locally. For example, to update the FHPs 545 in the second NMA 1050, the second NMA 1050 performs a discovery and reconciliation with the first NMA 1020 and the third NMA 1070. Similarly, each NMA performs discovery and reconciliation with every other peer NMA.

During the discovery and reconciliation between the second NMA 1050 and the first NMA 1020, for example, the second NMA 1050 discovers from the first NMA 1020 that the data (transmitted from the computer 1015 to the computer 1040 and the server 1080) is locally accessible to the third NMA 1070. The FHPs 545 of the first NMA 1020 include references to the data (e.g., in the page state information 550) and because the first NMA 1020 transferred the data to the third NMA 1070, the FHPs 545 indicate that the data is locally accessible to the third NMA 1070. The second NMA 1050 reconciles the references for the data in the FHPs 545 and further indicates that data is locally accessible to the third NMA 1070.

Referring again to FIG. 11, in sequence 1135, after the discovery and reconciliation in sequences 1120, 1125, and 1130, the computer 1040 in the second office 1030 transmits the data addressed to the server 1080 in the third office 1060. The data is intercepted by the second NMA 1050, and in sequence 1140, the second NMA 1050 determines whether a portion of the data is locally accessible to the third NMA 1070. Since the discovery and reconciliation, the FHPs 545 in the second NMA 1050 indicates that data is locally accessible to the third NMA 1070. In sequence 1145, the second NMA 1050 generates a retrieve instruction indicating to the third NMA 1070 to retrieve the data from an index within the database. The second NMA 1050 transfers the retrieve instruction to the third NMA 1070.

In sequence 1150, the third NMA 1070 processes the retrieve instruction. In sequence 1155, based on the retrieve instruction, the third NMA 1070 retrieves the data at the index within the database. In sequence 1160, the third NMA 1070 forwards the data to the server 1080.

Therefore, the network memory system 1000 provides improved application performance and data access between the first office 1010, the second office 1030, and the third office 1060. The network memory system 1000 provides access to locally accessible data, similar to distributed servers, without the complex management involved with replication and synchronization of the data among the distributed servers. Additionally, the network memory system 1000 reduces network traffic between the offices. Furthermore, discovery and reconciliation provides performance advantages by periodically or continuously updating the FHPs 545 in each NMA.

Figure 12:
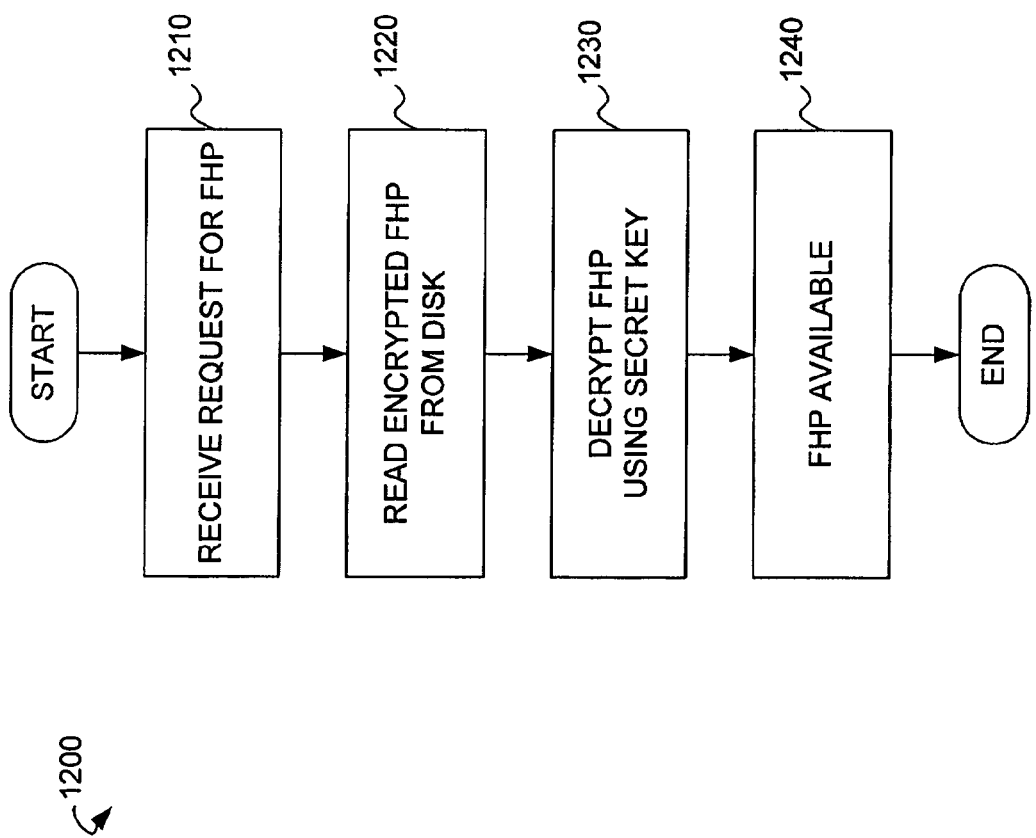
FIG. 12 illustrates a flowchart for the central appliance or the branch appliance for decryption using a secret key, in an exemplary implementation of the invention.

FIG. 12 illustrates a flowchart for the branch appliance 350 for decryption 1200, in an exemplary implementation of the invention. In other implementations of the invention, the central appliance 380 may perform decryption 1200. In step 1210, the branch appliance 350 receives a data request 610 for a FHP 545 that is locally accessible to the receiving appliance. In step 1220, the branch appliance 350 then reads the encrypted FHP 545 from the index within the database 850 or the database 950. This process may last five to ten milliseconds. To decrypt the FPH 545, the branch appliance 350 uses a secret key in step 1230. The decryption may last one to five milliseconds. The secret key may be stored in the memory 820 of the branch appliance 350. In step 1240, the branch appliance 350 decrypts the FHP 545 and makes the FHP 545 available to the computers 340 in a total time of about fifteen to twenty milliseconds.

Figure 13:
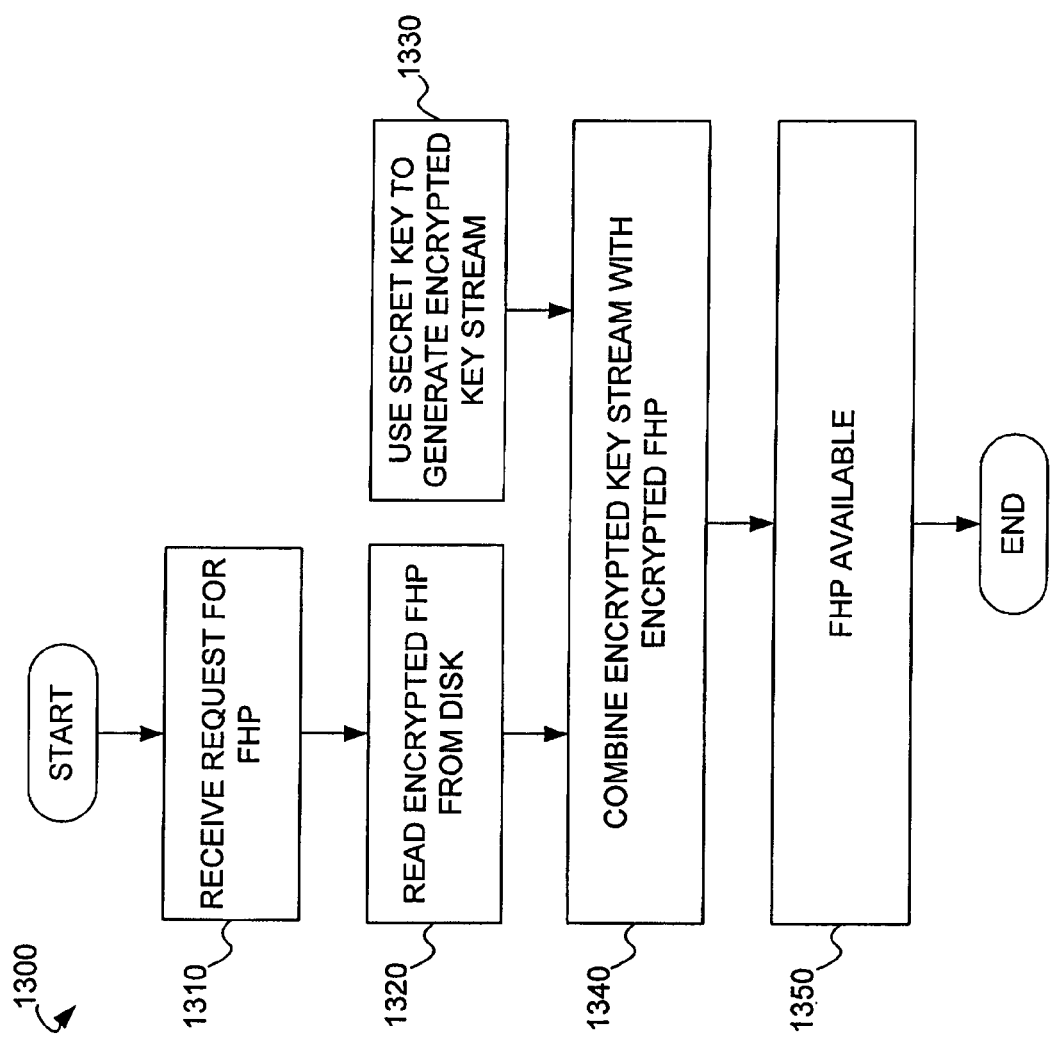
FIG. 13 illustrates a flowchart for the central appliance or the branch appliance for decryption using a key stream, in an exemplary implementation of the invention.

FIG. 13 illustrates a flowchart for the branch appliance 350 for decryption 1300 using a key stream in an exemplary implementation of the invention. In other implementations of the invention, the central appliance 380 may perform decryption 1300. If the branch appliance uses a key stream, the time required to retrieve and decrypt a requested FHP 545 can be decreased. In step 1310, the branch appliance 350 receives a data request 610 for an encrypted FHP 545 that is locally accessible to the branch appliance 350. In step 1320, the branch appliance 350 then reads the encrypted FHP 545 from the index within the database 850. This process may last five to ten milliseconds. During this step, the branch appliance 350 also performs step 1330 to generate a key stream of "random" numbers generated using the secret key. The generation of the key stream may last one to five milliseconds and runs in parallel to step 1320.

In step 1340, the branch appliance 350 decrypts the FHP 545 by combining the FHP 545 with the key stream. For example, the branch appliance 350 may combine the FHP 545 and the key stream using an XOR function. In step 1350, the FHP 545 is available to the computers 340 in a total time of about five to ten milliseconds, about the same amount of time required to retrieve data in an unencrypted system. Thus, the performance of the network is not affected by the decryption of the response data 625 when a key stream is used.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A network memory system for ensuring compliance, comprising:
    a source-site appliance comprising a first processor and a first memory device, and configured to be coupled to a source-site computer via a source-site local area network;
    a destination-site appliance comprising a second processor and a second memory device, and configured to be coupled to a destination-site computer via a destination-site local area network, the source-site computer in communication with the destination-site computer via a wide area network;
        the source-site appliance configured to intercept data sent from the source-site computer to the destination-site computer, encrypt the data, store the data in the first memory device, determine whether the data exists in the second memory device, and transmit a store instruction comprising the data if the data does not exist in the second memory device; and
        the destination-site appliance configured to receive the store instruction from the source-site appliance, store the data in the second memory device, subsequently receive a retrieve instruction comprising an index at which the data is stored in the second memory device, process the retrieve instruction to obtain encrypted response data, and decrypt the encrypted response data.

2. The network memory system of claim 1 wherein the destination-site appliance is further configured to transmit the decrypted response data.

3. The network memory system of claim 1 wherein the source-site appliance is configured to encrypt the data using an Advanced Encryption Scheme algorithm.

4. The network memory system of claim 1 wherein the source-site appliance is configured to encrypt the data using a Data Encryption Scheme algorithm.

5. The network memory system of claim 1 wherein the source-site appliance is configured to encrypt the data using a Triple Data Encryption Scheme algorithm.

6. The network memory system of claim 1 wherein the destination-site appliance is configured to combine the encrypted response data with a stream.

7. The network system of claim 1 wherein the source-site appliance is configured to store the data at the index independent of an application or data context.

8. A method for ensuring compliance in network memory, the method comprising:
    in a source-site appliance, intercepting data sent from a source-site computer to a destination-site computer, the source-site appliance coupled to the source-site computer via a source-site local area network and the source-site computer in communication with the destination-site computer via a wide area network;
    encrypting the data;
    storing the data in a first memory device within the source-site appliance;
    determining whether the data exists in a destination-site appliance appliance, the destination-site appliance coupled to the destination-site computer via a destination-site local area network;
    transmitting a store instruction comprising the data from the source-site appliance based on the determination that the data does not exist in the destination-site appliance;
    receiving the store instruction into the destination-site appliance;
    storing the data in a second memory device within the destination-site appliance;
    subsequently receiving a retrieve instruction into the destination-site appliance, the retrieve instruction comprising an index at which the data is stored;
    in the destination-site appliance, processing the retrieve instruction to obtain encrypted response data; and
    in the destination-site appliance, decrypting the encrypted response data.

9. The method of claim 8 further comprising transmitting the decrypted response data from the destination-site appliance.

10. The method of claim 8 further comprising encrypting the first data using an Advanced Encryption Scheme algorithm.

11. The method of claim 8 further comprising encrypting the first data using a Data Encryption Scheme algorithm.

12. The method of claim 8 further comprising encrypting the first data using a Triple Data Encryption Scheme algorithm.

13. The method of claim 8 further comprising combining the encrypted response data with a key stream.

14. The method of claim 9 further comprising storing the data at the index independent of an application or data context.

15. A software product for ensuring compliance in network memory comprising:
    software operational when executed by a processor to direct the processor to intercept data sent from a source-site computer to a destination-site computer, encrypt the data in a source-site appliance, store the data in a first memory device within the source-site appliance, determine whether the data exists in a destination-site appliance, transmit a store instruction comprising the data from the source-site appliance based on the determination that the data does not exist in the destination-site appliance, receive the store instruction into the destination-site appliance, store the data in a second memory device within the destination-site appliance, subsequently receive a retrieve instruction into the destination-site appliance, the retrieve instruction comprising an index at which the data is stored, process the retrieve instruction to obtain encrypted response data in the destination-site appliance, and decrypt the encrypted response data in the destination-site appliance; and a storage medium that stores the software.

16. The software product of claim 15 wherein the software is operational when executed by the processor to transmit the decrypted response data.

17. The software product of claim 15 wherein the software is operational when executed by the processor to encrypt the data using an Advanced Encryption Scheme algorithm.

18. The software product of claim 15 wherein the software is operational when executed by the processor to encrypt the data using a Data Encryption Scheme algorithm.

19. The software product of claim 15 wherein the software is operational when executed by the processor to encrypt the data using a Triple Data Encryption Scheme algorithm.

20. The software product if claim 15 wherein the software is operational when executed by the processor to combine the encrypted response data with a key stream.

21. The software product of claim 15 wherein the software is operational when executed by the processor to store the data at the index independent of an application or data context.

22. The network memory system of claim 1 wherein the destination-site computer is a server.

23. The method of claim 8 wherein the destination-site computer is a server.

24. The software product of claim 15 wherein the destination-site computer is a server.

* * * * *

UNITED STATES PATENT AND TRADEMARK OFFICE
CERTIFICATE OF CORRECTION

| | | |
|---|---|---|
| PATENT NO. | : 8,392,684 B2 | Page 1 of 1 |
| APPLICATION NO. | : 11/497026 | |
| DATED | : March 5, 2013 | |
| INVENTOR(S) | : David Anthony Hughes | |

It is certified that error appears in the above-identified patent and that said Letters Patent is hereby corrected as shown below:

In the Claims

Issued claim 14 should depend from issued claim 8.

Signed and Sealed this
Fourteenth Day of April, 2015

Michelle K. Lee
*Director of the United States Patent and Trademark Office*